(12) United States Patent
Palanki et al.

(10) Patent No.: US 8,982,750 B2
(45) Date of Patent: Mar. 17, 2015

(54) METHOD AND APPARATUS FOR TRANSMITTING OVERLOAD INDICATOR OVER THE AIR

(75) Inventors: Ravi Palanki, San Diego, CA (US); Juan Montojo, San Diego, CA (US); Aamod D. Khandekar, San Diego, CA (US); Tao Luo, San Diego, CA (US); Kapil Bhattad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 912 days.

(21) Appl. No.: 12/686,260

(22) Filed: Jan. 12, 2010

(65) Prior Publication Data

US 2010/0182903 A1    Jul. 22, 2010

Related U.S. Application Data

(60) Provisional application No. 61/145,428, filed on Jan. 16, 2009, provisional application No. 61/159,607, filed on Mar. 12, 2009.

(51) Int. Cl.
*H04B 7/00* (2006.01)
*H04L 1/00* (2006.01)
(Continued)

(52) U.S. Cl.
CPC ............ *H04L 1/0041* (2013.01); *H04L 1/0072* (2013.01); *H04L 5/0007* (2013.01); *H04L 5/0053* (2013.01); *H04L 27/2613* (2013.01); *H04B 7/0617* (2013.01); *H04L 7/041* (2013.01)
USPC ......................................................... 370/310

(58) Field of Classification Search
CPC .............. H04W 28/08; H04W 36/005; H04W 36/0011; H04W 36/16; H04W 36/20
USPC ......... 370/310, 328, 464, 480, 496, 498, 503, 370/509; 455/422, 450, 59–61, 70
See application file for complete search history.

(56) References Cited

U.S. PATENT DOCUMENTS 6,993,361 B2 * 1/2006 Chitrapu .................... 455/562.1
7,277,709 B2 * 10/2007 Vadgama ...................... 455/453
(Continued)

FOREIGN PATENT DOCUMENTS

| CN | 101043640 A | 9/2007 |
|---|---|---|
| CN | 101180804 A | 5/2008 |

(Continued)

OTHER PUBLICATIONS

Lucent Technologies, Uplink scheduling with inter-cell power control, R1-063478, 3GPP TSG-RAN WG1 #47, Nov. 2006, pp. 1-7.*

(Continued)

*Primary Examiner* — Dmitry H Levitan

(57) ABSTRACT

Techniques for transmitting overload indicators over the air to UEs in neighbor cells are described. In one design, an overload indicator may be transmitted as a phase difference between at least one synchronization signal and a reference signal for a cell. In another design, an overload indicator may be transmitted as a phase difference between consecutive transmissions of at least one synchronization signal for a cell. In yet another design, an overload indicator may be transmitted by a cell on resources reserved for transmitting the overload indicator. In yet another design, an overload indicator may be transmitted by a cell on a low reuse channel or a broadcast channel. For all designs, a UE may receive overload indicators from neighbor cells, determine the loading of each neighbor cell based on the overload indicator for that cell, and control its operation based on the loading of the neighbor cells.

21 Claims, 15 Drawing Sheets

(51) Int. Cl.
*H04L 5/00* (2006.01)
*H04L 27/26* (2006.01)
*H04B 7/06* (2006.01)
*H04L 7/04* (2006.01)

(56) References Cited

U.S. PATENT DOCUMENTS

| | | | |
|---|---|---|---|
| 7,363,005 B2* | 4/2008 | Baccelli et al. | 455/39 |
| 7,587,206 B2* | 9/2009 | Bi et al. | 455/453 |
| 7,965,789 B2 | 6/2011 | Khandekar et al. | |
| 8,068,513 B2* | 11/2011 | Frederiksen et al. | 370/468 |
| 8,150,443 B2* | 4/2012 | Pedersen et al. | 455/522 |
| 8,433,357 B2 | 4/2013 | Gorokhov et al. | |
| 2002/0061764 A1 | 5/2002 | Kim et al. | |
| 2004/0235510 A1 | 11/2004 | Elicegui et al. | |
| 2004/0252658 A1* | 12/2004 | Hosein et al. | 370/328 |
| 2005/0136960 A1 | 6/2005 | Timus et al. | |
| 2005/0250497 A1* | 11/2005 | Ghosh et al. | 455/436 |
| 2005/0254555 A1 | 11/2005 | Teague | |
| 2005/0277425 A1 | 12/2005 | Niemela et al. | |
| 2006/0019694 A1 | 1/2006 | Sutivong et al. | |
| 2006/0209721 A1 | 9/2006 | Mese et al. | |
| 2007/0033618 A1 | 2/2007 | Kiukkonen et al. | |
| 2007/0082619 A1 | 4/2007 | Zhang et al. | |
| 2007/0297360 A1 | 12/2007 | Joachim et al. | |
| 2008/0008152 A1 | 1/2008 | Lohr et al. | |
| 2008/0043879 A1 | 2/2008 | Gorokhov et al. | |
| 2008/0075030 A1 | 3/2008 | Timus et al. | |
| 2008/0081655 A1* | 4/2008 | Shin et al. | 455/522 |
| 2008/0165675 A1 | 7/2008 | Yang et al. | |
| 2008/0205361 A1 | 8/2008 | Takeuchi et al. | |
| 2008/0205375 A1 | 8/2008 | Onggosanusi et al. | |
| 2008/0214121 A1 | 9/2008 | Sutivong et al. | |
| 2008/0232326 A1* | 9/2008 | Lindoff et al. | 370/332 |
| 2008/0253300 A1 | 10/2008 | Wakabayashi et al. | |
| 2008/0254804 A1 | 10/2008 | Lohr et al. | |
| 2008/0304584 A1 | 12/2008 | Nishio et al. | |
| 2009/0097444 A1 | 4/2009 | Lohr et al. | |
| 2009/0109939 A1 | 4/2009 | Bhushan et al. | |
| 2009/0156225 A1* | 6/2009 | Angelow et al. | 455/450 |
| 2009/0163238 A1 | 6/2009 | Rao et al. | |
| 2009/0179755 A1* | 7/2009 | Bachl et al. | 340/540 |
| 2009/0219876 A1 | 9/2009 | Kimura et al. | |
| 2009/0258651 A1 | 10/2009 | Sagfors et al. | |
| 2010/0008317 A1 | 1/2010 | Bhattad et al. | |
| 2010/0020760 A1* | 1/2010 | Grandblaise et al. | 370/330 |
| 2010/0159950 A1* | 6/2010 | Toh et al. | 455/456.1 |
| 2010/0182903 A1 | 7/2010 | Palanki et al. | |
| 2010/0203882 A1 | 8/2010 | Frenger et al. | |
| 2010/0234061 A1 | 9/2010 | Khandekar et al. | |
| 2010/0253400 A1 | 10/2010 | Lai et al. | |
| 2011/0021239 A1 | 1/2011 | Wakabayashi et al. | |
| 2013/0242744 A1 | 9/2013 | Wigren et al. | |

FOREIGN PATENT DOCUMENTS

| | | |
|---|---|---|
| EP | 1276340 A1 | 1/2003 |
| EP | 1901442 A2 | 3/2008 |
| EP | 1976168 A1 | 10/2008 |
| EP | 2124350 A1 | 11/2009 |
| JP | H09172685 A | 6/1997 |
| JP | 2001103531 A | 4/2001 |
| JP | 2008211411 A | 9/2008 |
| JP | 2008236429 A | 10/2008 |
| JP | 2009543428 A | 12/2009 |
| WO | WO-9113502 A1 | 9/1991 |
| WO | WO-9113582 A1 | 9/1991 |
| WO | WO-2006099547 A1 | 9/2006 |
| WO | WO-2007024931 A2 | 3/2007 |
| WO | WO-2008004840 A2 | 1/2008 |
| WO | WO-2008008920 A2 | 1/2008 |
| WO | WO 2008038979 A2 | 4/2008 |
| WO | WO-2008055132 A2 | 5/2008 |
| WO | WO-2008086143 | 7/2008 |
| WO | WO 2008103981 A2 | 8/2008 |
| WO | WO 2009132133 A1 | 10/2009 |

OTHER PUBLICATIONS

3GPP2: "Physical Layer for Ultra Mobile Broadband (UMB) Air Interface Specification, 3GPP2 C.S0084-001-0 v2.0", Aug. 2007, pp. 4-1-4-58.
ETRI: "Open-Loop Transmit Diversity Scheme for P-BCH Using S-SCH" 3GPP RAN WG1 Meeting #48, R1-070747, Feb. 6, 2007.
ETRI: "Performance Comparison of Transmit Diversity Schemes for P-BCH" 3GPP RAN WG1 Meeting #49, R1-072126, May 2, 2007.
International Search Report and Written Opinion-PCT/US2010/021257, International Search Authority-European Patent Office-Aug. 10, 2010.
Jette, et al., "UMBFDD Draft Technology Overview, IEEE C802.20-07/09", IEEE 802.20 Working Group on Mobile Broadband Wireless Access, Mar. 5, 2007, pp. 1-34.
Lucent Technologies: "Uplink Scheduling With Inter-cell Interference Control", 3GPP Draft; R2-062814, 3rd Generation Partnership Project (3GPP), Mobile Competence Centre ; 650, Route Des Lucioles ; F-06921 Sophia-Antipolis Cedex ; France, vol. RAN WG2, No. Seoul, Korea; Oct. 5, 2006, XP050132339.
Partial International Search Report-PCT/US2010/021257-International Search Authority EPO-Jun. 4, 2010.
Sarkar, et al., "MIMO in Wireless Wan-The UMB System," Communication Systems Software and Middleware and Workshops, 2008, Jan. 6, 2008, pp. 57-64, ISBN: 978-1-4244-1796-4.
Wang, et al., "Interference Management and Handoff Techniques in Ultra Mobile Broadband Communication Systems" IEEE International Symposium Onspread Spectrum Techniques and Applications, Aug. 25, 2008 (Aug. 25, 2008), pp. 166-172, XP031319003.
Wang, et al., "Preamble Design and System Acquisition in Ultra Mobile Broadbane Communication Systems," Vehicular Technology Conference 2008, Sep. 21, 2008, pp. 1-8, ISBN: 987-1-4244-1796-4.
3GPP TS 36.300 v8.7.0, TSG RAN Evolved Universal Terrestrial Radio Access (E-UTRA) and Evolved Universal Terrestrial Radio Access Network (E-UTRAN), Overall Description, Stage 2 Release Dec. 8, 2008, pp. 19-20.
3GPP TSG RAN WG1 #51bis R1-080564 "LS on Ran1 ICIC status" RAN WG1, Release 8, Seville, Spain, Jan. 14-18, 2008, pp. 1-2.
Alcatel-Lucent: "On the Overload Indicator Interworking with ICIC" 3GPP Draft; R1-080447, 3rd Generation Partnership Project (3GPP), Mobile Competence Centre ; 650, Route Des Lucioles ; F-06921 Sophia-Antipolis Cedex ; France, vol. RAN WG1, No. Sevilla, Spain; Jan. 9, 2008 (Jan. 9, 2008), XP050108965 p. 3-p. 4.
"Telecom Italia "Way forward on UL ICIC/Overload Indicator for LTE" 3GPP TSG RAN WG1 #51 R1-075050, Jeju, Korea, Nov. 5-9, 2007, pp. 1-2".
3rd Generation Partnership Project 2, 3GPP2: "Physical Layer for Ultra Mobile Broadband (UMB) Air Interface Specification", 3GPP2 C.S0084-001-0 v2.0, Aug. 2007 (Aug. 2007), 3GPP2, XP002581093, vol. 2.0, pp. 4-1-4-58.
Motorola:"Uplink Inter-Cell Power Control: X2 Messages", 3GPP TSG RAN1 #50-bis, R1-074042, Oct. 8-12, 2007, p. 1.
Nicopolitidis P., "Third Generation and Beyond Wireless Systems", Communications of the ACM Communications of the ACM, vol. 46, No. 8, Aug. 2003 (Aug. 2003), pp. 120-124, Retrieved from the Internet: URL:http://users.auth.gr/~petros/papers/cacm-3G.pdf [retrieved on Oct. 8, 2013].
Partial European Search Report-EP13020065-Search Authority-Munich-Sep. 26, 2013.
Partial European Search Report-EP13020067-Search Authority-Munich-Sep. 26, 2013.
Xiang Yikang., et al., "Inter-cell Interference Mitigation through FlexibleResource Reuse in OFDMA based Communication-Networks", European Wireless Conference, Apr. 4, 2007 (Apr. 4, 2007), pp. 1-7, Paris, France, Retrieved from the Internet URL:http://confs.comelec.telecom-paristech.fr/EW2007/papers/1569014820.pdf [retrieved on Oct 8, 2013].
European Search Report-EP13020066-Search Authority-Munich-Oct. 22, 2013.

(56) References Cited

OTHER PUBLICATIONS

European Search Report-EP13020064-Search Authority-Munich-Oct. 31, 2013.
European Search Report-EP13020065-Search Authority-Munich-Jan. 7, 2014.
European Search Report-EP13020067-Search Authority-Munich-Jan. 16, 2014.
Taiwan Search Report—TW099101083—TIPO—Mar. 4, 2014.
3GPP TS 36.300 v8.7.0, TSG RAN Evolved Universal Terrestrial Radio Access (E-UTRA) and Evolved Universal Terrestrial Radio Access Network (E-UTRAN), Overall Description, Stage 2 Release 8 December 2008, pp. 19-20.
Alcatel-Lucent: "On the Overload Indicator Interworking with ICIC" 3GPP Draft; R1-080447, 3rd Generation Partnership Project (3GPP), Mobile Competence Centre ; 650, Route Des Lucioles ; F-06921 Sophia-Antipolis Cedex ; France, vol. RAN WG1, No. Sevilla, Spain; 20080109, Jan. 9, 2008, XP050108965 p. 3-p. 4.

* cited by examiner

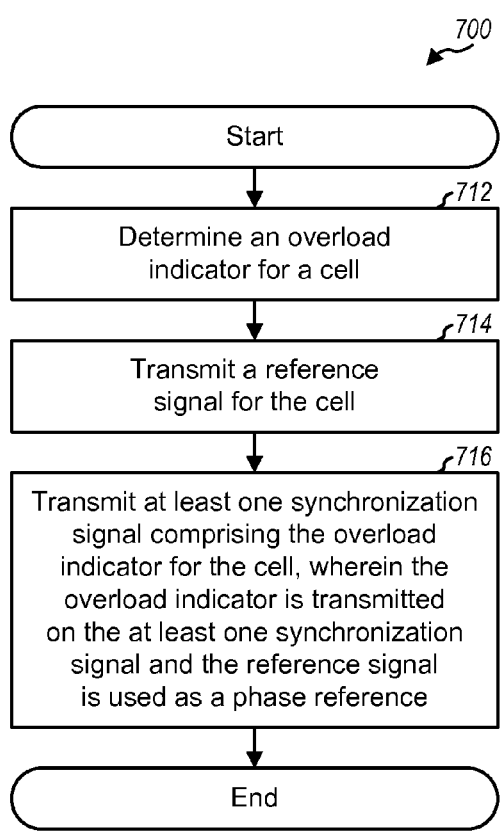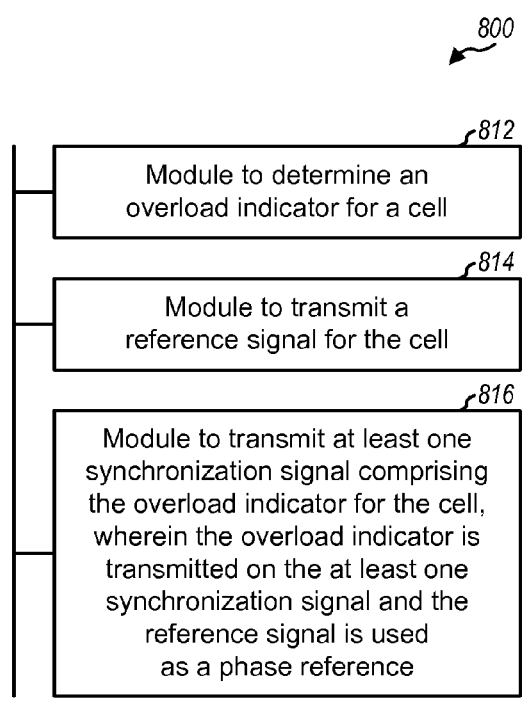
FIG. 7
FIG. 8

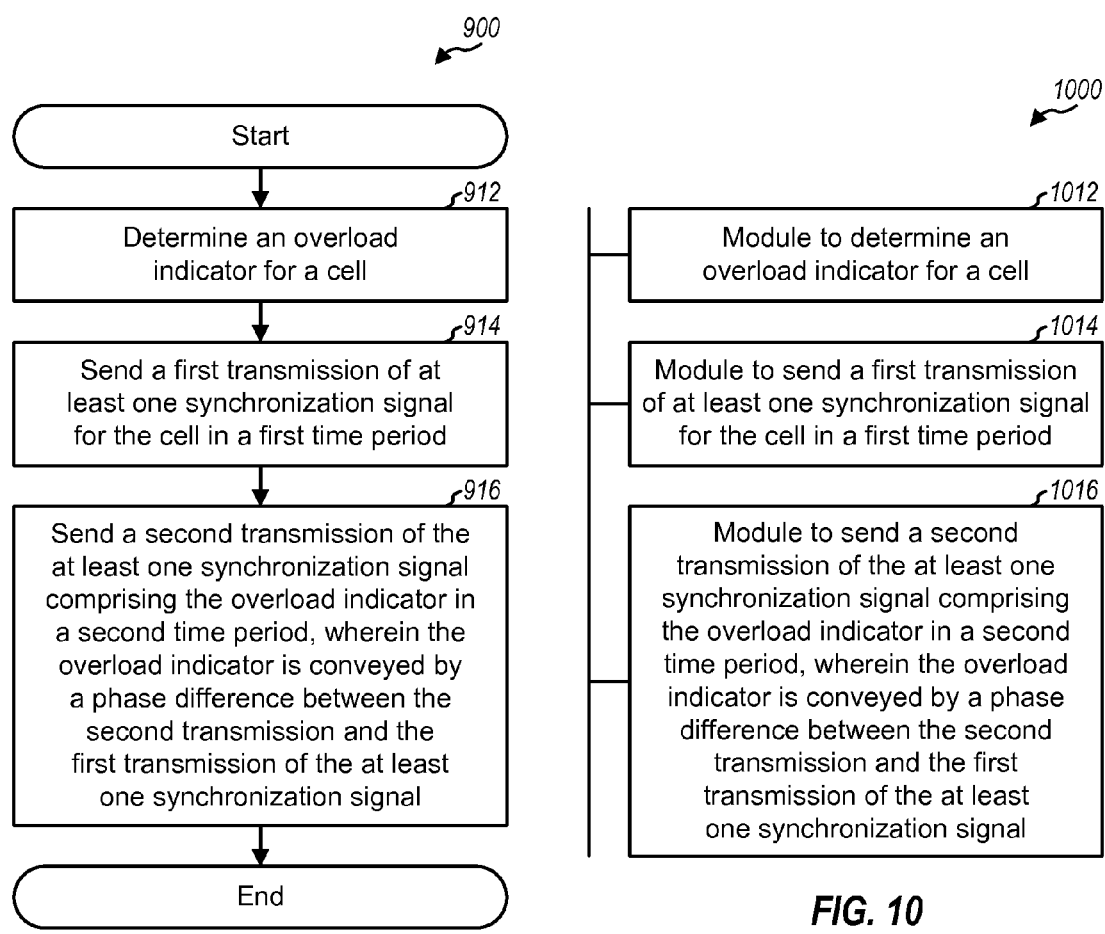

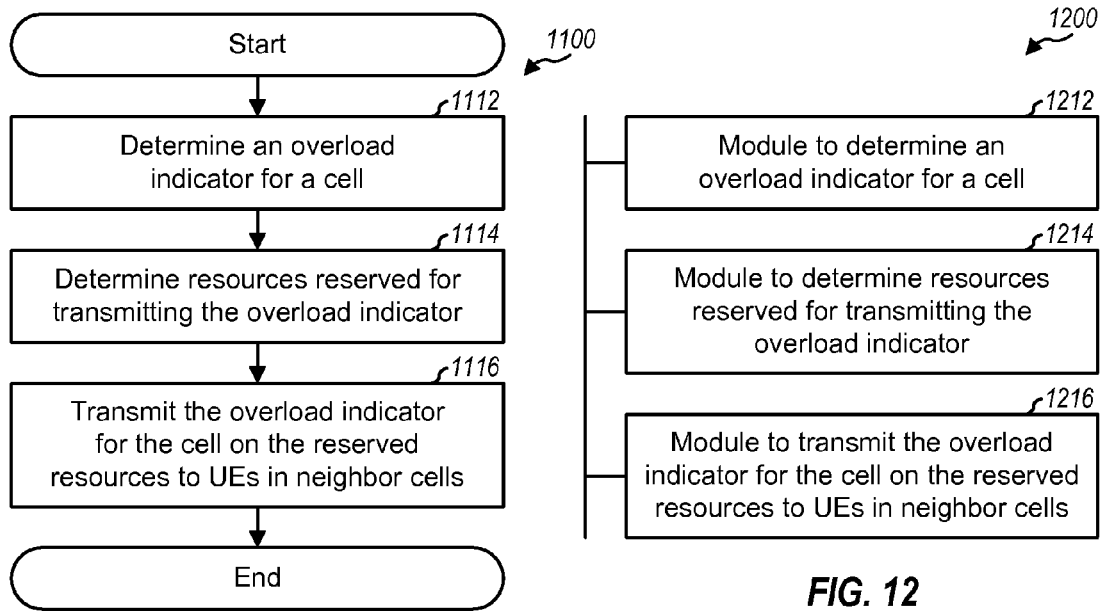
FIG. 11
FIG. 12
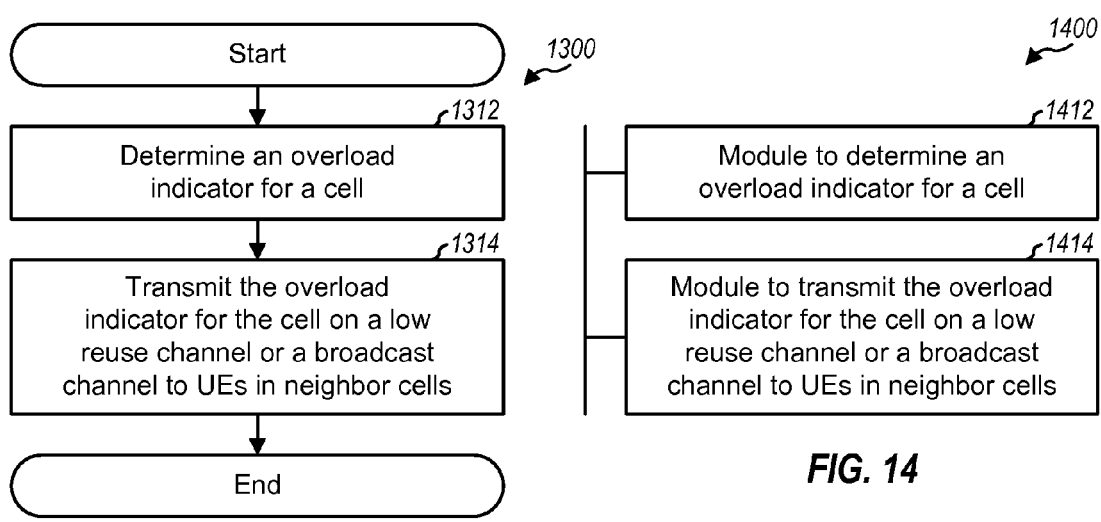
FIG. 13
FIG. 14

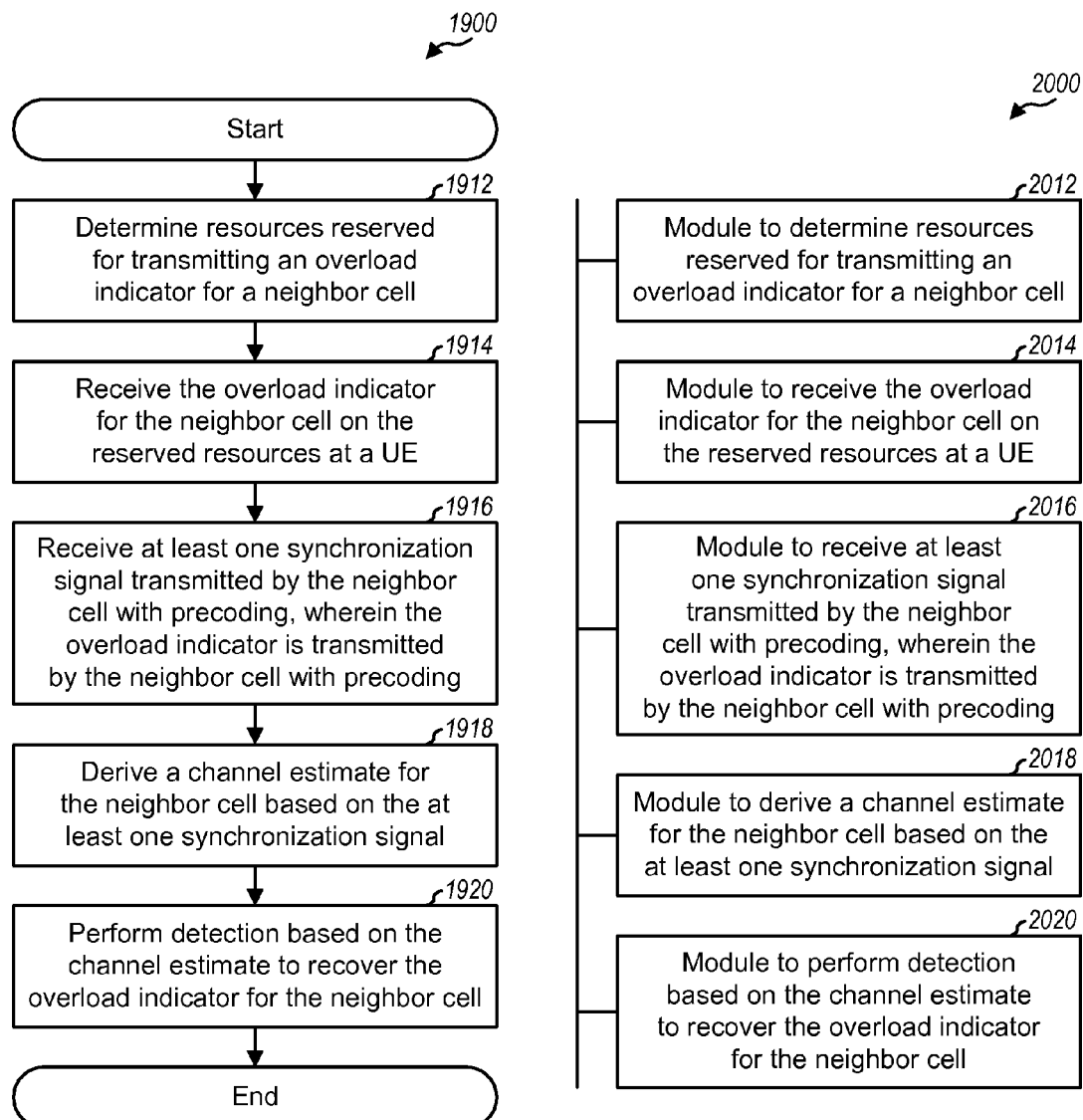

METHOD AND APPARATUS FOR TRANSMITTING OVERLOAD INDICATOR OVER THE AIR

The present application claims priority to provisional U.S. Application Ser. No. 61/145,428, entitled "Method and Apparatus to Support an Over-the-Air (OTA) Load Indicator," filed Jan. 16, 2009, and U.S. Application Ser. No. 61/159,607, entitled "Over-the-Air Overload Indicator," filed Mar. 12, 2009, both of which are assigned to the assignee hereof and incorporated herein by reference.

BACKGROUND

I. Field

The present disclosure relates generally to communication, and more specifically to techniques for transmitting information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A base station may concurrently communicate with multiple UEs via the downlink and the uplink. The downlink (or forward link) refers to the communication link from the base station to the UEs, and the uplink (or reverse link) refers to the communication link from the UEs to the base station. On the uplink, each UE may transmit data and/or other information to its serving base station, and the transmission from the UE may cause interference to neighbor base stations. It may be desirable to mitigate interference in order to improve system performance.

SUMMARY

Techniques for transmitting overload indicators over the air to UEs in neighbor cells to manage interference and improve system performance are described herein. An overload indicator for a cell may comprise various type of information that may be used to support system operation and improve performance. For example, the overload indicator may indicate the loading of the cell, e.g., whether the cell is observing heavy loading.

In a first design, an overload indicator may be transmitted as a phase difference between at least one synchronization signal and a reference signal for a cell. The cell may determine the overload indicator based on its loading. The cell may transmit the reference signal, which may be used by UEs for channel estimation and/or other purposes. The cell may also transmit the at least one synchronization signal, which may be used by UEs for cell acquisition and/or other purposes. The overload indicator may be transmitted on the at least one synchronization signal, and the reference signal may be used as a phase reference.

In a second design, an overload indicator may be transmitted as a phase difference between consecutive transmissions of at least one synchronization signal for a cell. The cell may determine the overload indicator based on its loading. The cell may send a first transmission of the at least one synchronization signal in a first time period. The cell may also send a second transmission of the at least one synchronization signal comprising the overload indicator in a second time period. The overload indicator may be conveyed by a phase difference between the second transmission and the first transmission of the at least one synchronization signal.

In a third design, an overload indicator may be transmitted by a cell on resources reserved for transmitting the overload indicator. The cell may determine the overload indicator based on its loading. The cell may determine resources reserved for transmitting the overload indicator. The reserved resources may comprise resource elements in a data region of at least one resource block, resource elements in a control region of at least one resource block, unused resource elements in at least one resource block, and/or other resource elements. The cell may transmit the overload indicator on the reserved resources to UEs in neighbor cells.

In a fourth design, an overload indicator may be transmitted by a cell on a low reuse channel or a broadcast channel. The cell may determine the overload indicator based on its loading. The cell may transmit the overload indicator on the low reuse channel (which may observe less interference from neighbor cells) or on the broadcast channel to UEs in neighbor cells. The cell may also transmit at least one overload indicator for at least one neighbor cell on the low reuse channel or the broadcast channel to its UEs.

An overload indicator may also be transmitted over the air in other manners. For all designs, a UE may receive one or more overload indicators from one or more neighbor cells. The UE may perform detection for the overload indicators in a manner dependent on how the overload indicators are transmitted by the neighbor cells. The UE may determine the loading of each neighbor cell based on the overload indicator for that neighbor cell. The UE may control its operation based on the loading of the neighbor cells. The UE may also determine feedback information based on the overload indicators and may send the feedback information to the serving cell.

Various aspects and features of the disclosure are described in further detail below.

BRIEF DESCRIPTION OF THE DRAWINGS

FIGS. 7, 9, 11 and 13 show processes for transmitting an overload indicator based on the first, second, third and fourth designs, respectively.
FIGS. 8, 10, 12 and 14 show apparatuses for transmitting an overload indicator based on the first, second, third and fourth designs, respectively.
FIGS. 15, 17, 19 and 21 show processes for receiving an overload indicator transmitted based on the first, second, third and fourth designs, respectively.
FIGS. 16, 18, 20 and 22 show apparatuses for receiving an overload indicator transmitted based on the first, second, third and fourth designs, respectively.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
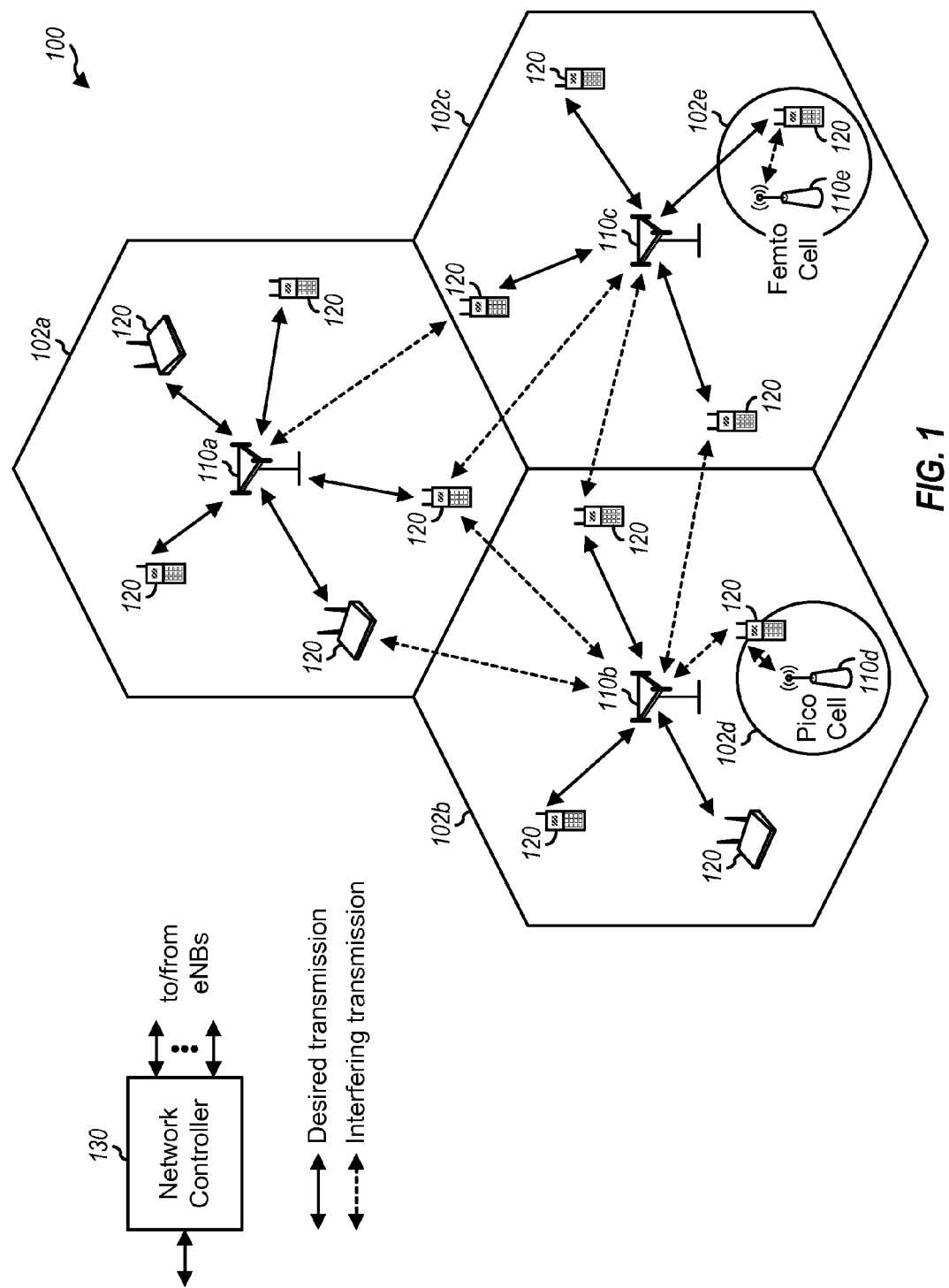
FIG. 1 shows a wireless communication system.

FIG. 1 shows a wireless communication system 100, which may be an LTE system or some other system. System 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. To improve capacity, the overall coverage area of an eNB may be partitioned into multiple (e.g., three) smaller areas. In 3GPP, the term "cell" can refer to the smallest coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. eNB 110d may be a pico eNB for a pico cell 102d. eNB 110e may be a femto eNB for a femto cell 102e. The terms "cell", "eNB", and "base station" may be used interchangeably.

A network controller 130 may couple to a set of eNBs and may provide coordination and control for these eNBs. Network controller 130 may communicate with eNBs 110 via a backhaul. eNBs 110 may also communicate with one another, e.g., directly or indirectly via wireless or wireline backhaul.

System 100 may be a synchronous system or an asynchronous system. For a synchronous system, the eNBs may have similar frame timing, and transmissions from different eNBs may be approximately aligned in time. For an asynchronous system, the eNBs may have different frame timing, and transmissions from different eNBs may not be aligned in time.

UEs 120 may be dispersed throughout system 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with a cell via the downlink and uplink. In FIG. 1, a solid line with double arrows indicates desired transmissions between a UE and a serving cell, which is a cell designated to serve the UE. A dashed line with double arrows indicates interfering transmissions between a UE and a neighbor cell, which is a cell not serving the UE.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

Figure 2:
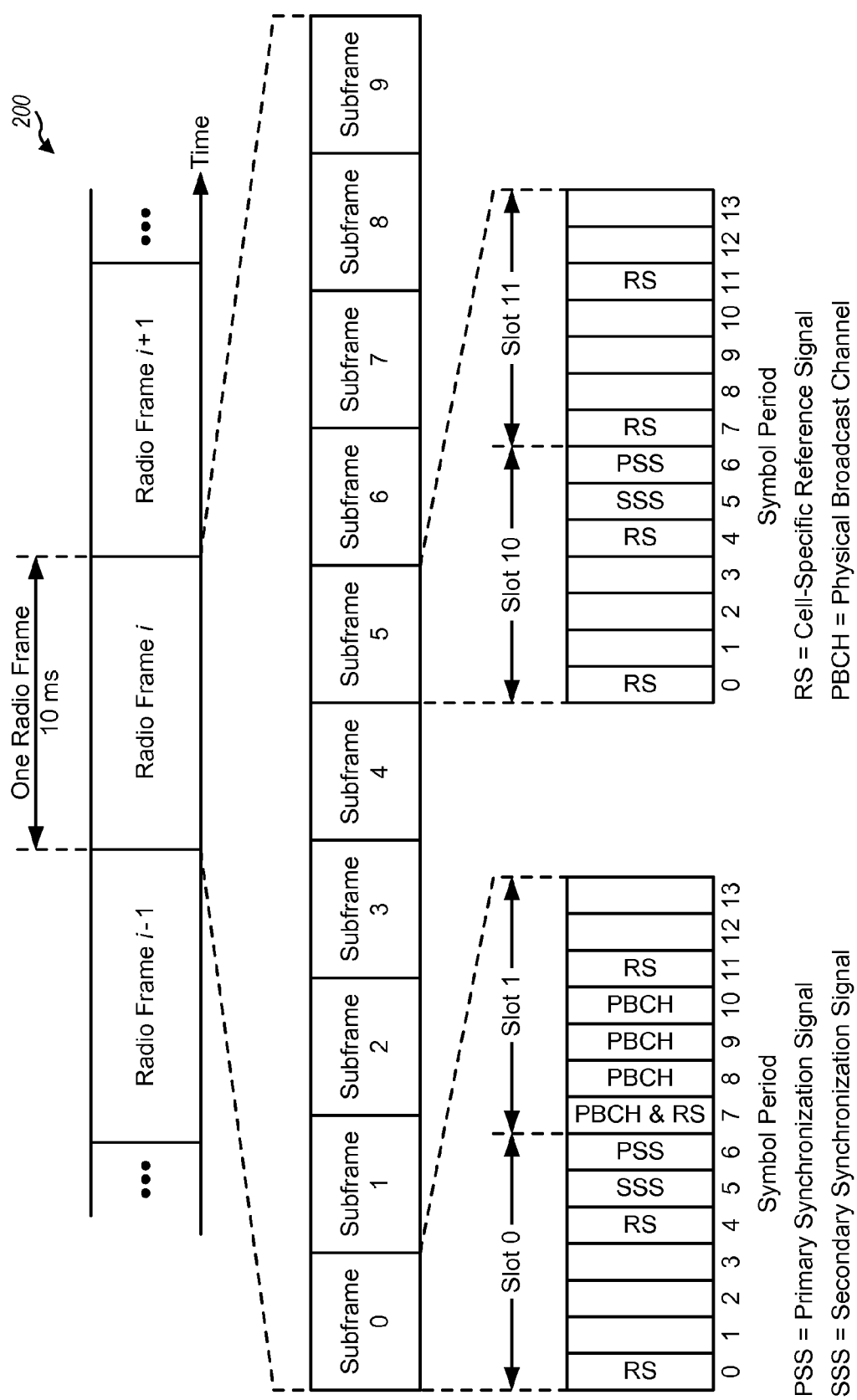
FIG. 2 shows an exemplary frame structure.

FIG. 2 shows an exemplary frame structure 200 used for the downlink in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, each cell may transmit a primary synchronization signal (PSS) and a secondary synchronization signal (SSS) on the downlink. For frequency division duplexing (FDD) in LTE, which is shown in FIG. 2, the PSS and SSS may be transmitted in symbol periods 6 and 5, respectively, in each of subframes 0 and 5 of each radio frame with the normal cyclic prefix, as shown in FIG. 2. The PSS and SSS may be used by UEs for cell acquisition. Each cell may also transmit a Physical Broadcast Channel (PBCH) in symbol periods 0 to 3 in slot 1 of subframe 0. The PBCH may carry certain system information. Each cell may transmit the PSS, SSS and PBCH in the center 1.08 MHz of the system bandwidth and may send other transmissions in the remaining part of the system bandwidth.

The PSS, SSS, and PBCH in LTE are described in 3GPP TS 36.211, entitled "Evolved Universal Terrestrial Radio Access (E-UTRA); Physical Channels and Modulation," which is publicly available.

Figure 3:
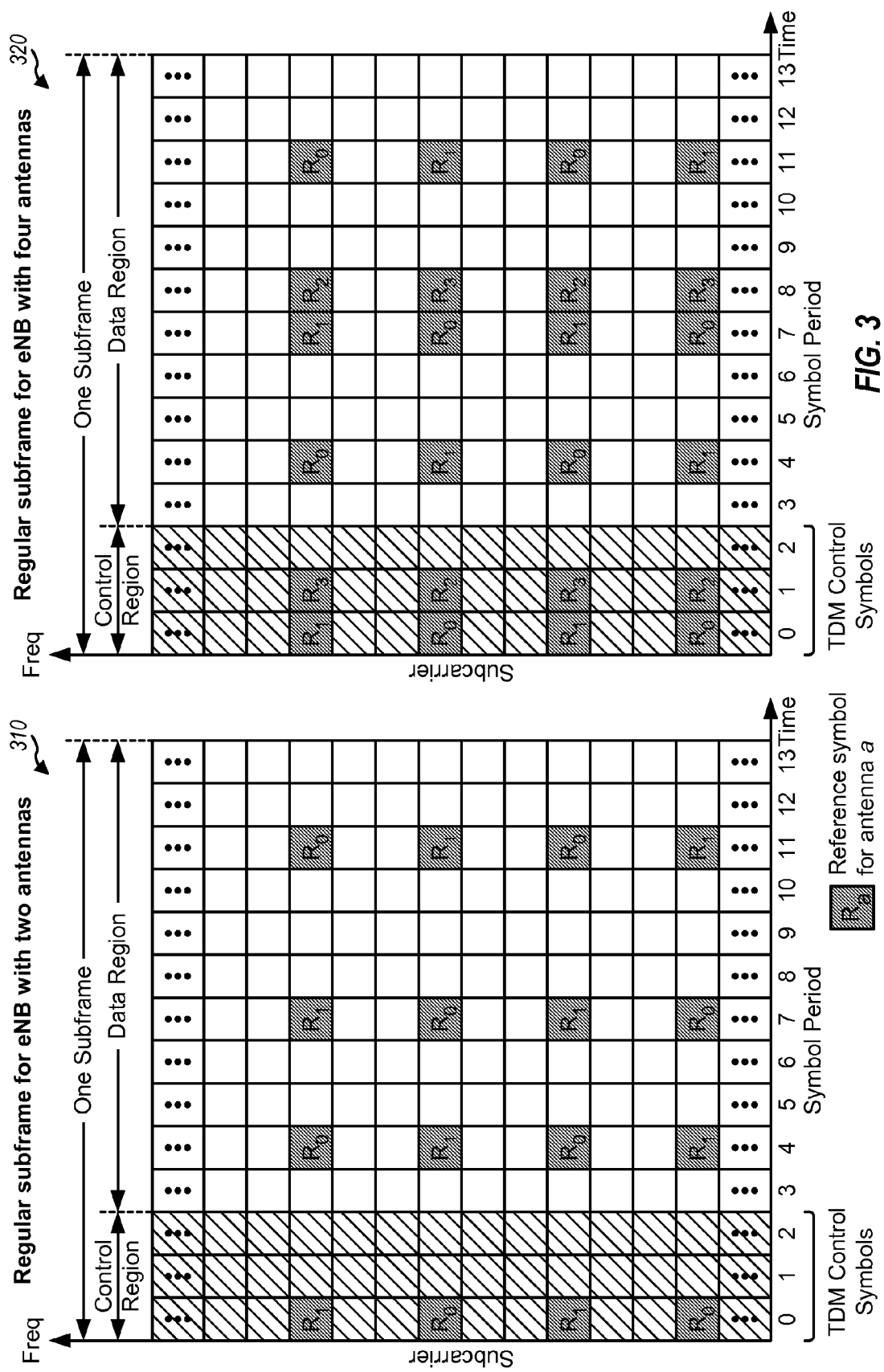
FIG. 3 shows two exemplary subframe formats.

FIG. 3 shows two exemplary regular subframe formats 310 and 320 for the downlink for the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

As shown in FIG. 3, a subframe may include a control region followed by a data region. The control region may include the first M OFDM symbols of the subframe, where M may be equal to 1, 2, 3 or 4. M may change from subframe to subframe and may be conveyed by a Physical Control Format Indicator Channel (PCFICH) that is sent in the first symbol period of the subframe. The first M OFDM symbols may be TDM control symbols, which are OFDM symbols carrying control information. The data region may include the remaining 2L−M symbol periods of the subframe and may carry data for UEs. In the example shown in FIG. 3, each subframe includes three TDM control symbols with M=3. Control information may be sent in symbol periods 0 to 2, and data may be sent in the remaining symbol periods 3 to 13 of the subframe.

A cell may transmit a Physical HARQ Indicator Channel (PHICH) and a Physical Downlink Control Channel (PDCCH) in the control region. The PHICH may carry information to support hybrid automatic retransmission (HARQ). The PDCCH may carry information on resource allocation for UEs and control information for downlink channels. The cell may transmit a Physical Downlink Shared Channel (PDSCH) in the data region. The PDSCH may carry data for UEs scheduled for data transmission on the downlink. The various channels in LTE are described in the aforementioned 3GPP TS 36.211.

Subframe format 310 may be used for an eNB equipped with two antennas. A cell-specific reference signal (RS) may be transmitted in symbol periods 0, 4, 7 and 11 and may be used by UEs for channel estimation and other measurements. A reference signal is a signal that is known a priori by a transmitter and a receiver and may also be referred to as pilot. A cell-specific reference signal is a reference signal that is specific for a cell, e.g., generated based on a cell identity (ID). In FIG. 3, for a given resource element with label $R_a$, a reference symbol may be transmitted on that resource element from antenna a, and no modulation symbols may be transmitted on that resource element from other antennas. Subframe format 320 may be used by an eNB equipped with four antennas. The RS may be transmitted in symbol periods 0, 1, 4, 7, 8 and 11. For both subframe formats 310 and 320, resource elements not used for the RS (shown without shading in FIG. 3) may be used to transmit data and/or control information.

In an aspect, a cell may transmit an overload indicator over the air to UEs in neighbor cells. An overload indicator (OI) may also be referred to as a load indicator (LI), an other sector interference (OSI) indicator, etc. The overload indicator may be used to control operation of the UEs to improve system performance.

Figure 4:
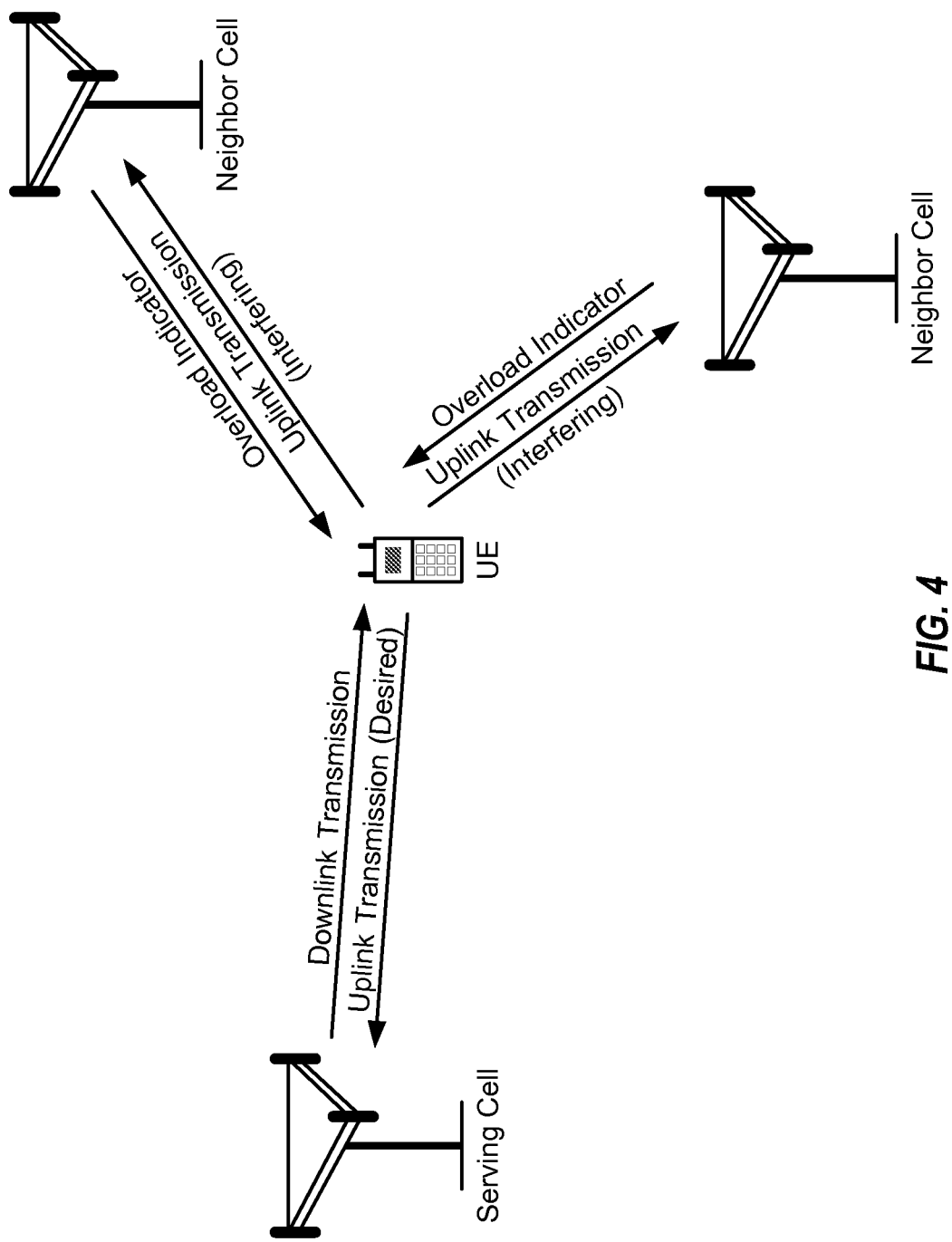
FIG. 4 shows a design of over-the-air transmission of overload indicators.

FIG. 4 shows a design of over-the-air (OTA) transmission of overload indicators. For simplicity, FIG. 4 shows a UE communicating with a serving cell and having two neighbor cells. In general, a UE may have any number of neighbor cells. As shown in FIG. 4, the UE may communicate with the serving cell, may receive downlink transmission from the serving cell, and may send uplink transmission to the serving cell. The uplink transmission from the UE may cause interference to the neighbor cells. The UE may also receive an overload indicator from each neighbor cell. The UE may control its operation based on the overload indicators received from the neighbor cells. Alternatively or additionally, the UE may generate feedback information based on the overload indicators and may send the feedback information to the serving cell.

In general, an overload indicator for a cell may comprise any information that may be used to support system operation and improve performance. In one design, the overload indicator may indicate the loading of the cell. For example, the overload indicator may comprise a single bit that may be set to either a first value (e.g., 0) to indicate light loading or a second value (e.g., 1) to indicate heavy loading. The overload indicator may also comprise more bits, which may be used to convey more loading levels. In another design, the overload indicator may indicate the amount of resources and/or the specific resources used by the cell. The overload indicator may also comprise other information indicative of loading of the cell.

In one design, an overload indicator may convey loading of a cell for the entire system bandwidth. In other designs, an overload indicator may convey loading for a specific subband or frequency range, or a specific time interval, or specific time-frequency resources, etc.

An overload indicator may be used for various purposes. In one design, an overload indicator may be used for interference management. A cell may communicate with a number of UEs served by the cell (which may be referred to as the served UEs). The cell may observe interference from other UEs communicating with neighbor cells (which may be referred to as the neighbor UEs). The served UEs may also cause interference to the neighbor cells. The interference may degrade performance.

For interference management, a cell may transmit an overload indicator to the neighbor UEs. These UEs may control their operation based on the overload indicator from the cell. A given UE may receive overload indicators from neighbor cells and may control its operation based on these overload indicators. In a first design, the UE may reduce its transmit power, skip certain transmission, avoid using certain resources, and/or perform other actions if the overload indicator from any neighbor cell indicates heavy loading at that neighbor cell. In a second design, the UE may report the overload indicators from the neighbor cells to the serving cell. In a third design, the UE may compute a transmit power level that it should use based on the received overload indicators and may report this transmit power level to the serving cell. For the second and third designs, the serving cell may take corrective actions based on the feedback information (e.g., the overload indicators or the transmit power level) received from the UE and possibly other information (e.g., the pilot measurement reports from the UE) in order to reduce interference caused by the UE to the neighbor cells. For example, the serving cell may use this information for power control of the UE and in scheduling the UE.

An overload indicator may be intended for UEs in neighbor cells and may be transmitted such that it can be reliably received by these UEs. The overload indicator may also be received and used by the UEs in the cell. The overload indicator may be transmitted periodically (e.g., with a periodicity in a range of 5 to 30 ms) in order to timely convey changes in loading of the cell. The overload indicator may be transmitted on an overload indicator channel (OICH) in various manners.

In a first OICH design, an overload indicator may be transmitted as a phase difference between the PSS and/or SSS and the RS for a cell. The RS may be used as a reference phase. The overload indicator may be transmitted by varying the phase of the PSS and/or SSS relative to the reference phase. In general, the overload indicator may be transmitted on the PSS and/or the SSS. In the description below, "PSS/SSS" can refer to only the PSS, or only the SSS, or both the PSS and SSS.

The RS for the cell may be generated as follows. A reference signal sequence may be generated based on a pseudo-random sequence, which may be initialized based on the cell ID of the cell. The reference signal sequence may be mapped to a set of resource elements in an OFDM symbol carrying the RS. The set of resource elements may occupy subcarriers selected based on the cell ID and spaced apart by six subcarriers, as shown in FIG. 3.

The PSS for the cell may be generated as follows. A PSS sequence may be generated based on a Zadoff-Chu sequence, which may in turn be generated based on the cell ID of the cell. The PSS sequence may be mapped to 31 resource elements on each side of a center/DC subcarrier in an OFDM symbol carrying the PSS. The PSS may thus be generated based on the cell ID and transmitted in the center 945 KHz of the system bandwidth.

The SSS for the cell may be generated as follows. A set of pseudo-random sequences and scrambling sequences may be generated based on the cell ID of the cell. An SSS sequence may then be generated based on the set of pseudo-random sequences and scrambling sequences. The SSS sequence may be mapped to 31 resource elements on each side of the center/DC subcarrier in an OFDM symbol carrying the SSS. The SSS may thus be generated based on the cell ID and transmitted in the center 945 KHz of the system bandwidth.

The RS may be transmitted from only one physical antenna (or one antenna port) on any given resource element, e.g., as shown in FIG. 3. A UE can estimate the channel response from each physical antenna for the cell to the UE based on the RS transmitted from that physical antenna.

The PSS and SSS may be transmitted from a virtual antenna formed by a linear combination of T physical antennas for the cell, where T may be greater than one. In general, any set of weights may be used for the linear combination of the T physical antennas, and the selected weights form a beam for the PSS and SSS. The same beam may be used for one transmission/instance of the PSS and SSS sent the same subframe for FDD in LTE. However, the beam may change over time (e.g., different beams may be used for different transmissions of the PSS and SSS) to obtain spatial diversity. The UEs can receive the PSS and SSS without knowing the beams. However, when an overload indicator is transmitted as a phase difference between the PSS/SSS and the RS, the beam or weights may be specified or conveyed to the UEs to allow the UEs to recover the overload indicator. The UEs can then use the RS as a phase reference for a symbol carrying the overload indicator and modulated as a phase on the PSS/SSS The overload indicator may be transmitted in the PSS and/or the SSS. In LTE, there are three possible PSS sequences and 168 possible SSS sequences for a total of 504 cell IDs. Each cell transmits one PSS sequence and one SSS sequence determined based on its cell ID. The likelihood of multiple cells transmitting the same PSS sequence may be much greater than the likelihood of multiple cells transmitting the same SSS sequence. Hence, better performance may be obtained by transmitting the overload indicator in the SSS and performing detection for the overload indicator based on the SSS.

In one design, the overload indicator may be transmitted on the PSS or SSS as follows. A set of 62 symbols may be generated for the PSS or SSS, and each symbol may be a real or complex value. Each of the 62 symbols may be multiplied with a symbol for the overload indicator, as follows:

$$B(k) = X \cdot A(k), \quad \text{Eq (1)}$$

where $A(k)$ is a symbol for the PSS or SSS for subcarrier k,
X is a symbol for the overload indicator, and
$B(k)$ is a modulated symbol for carrier k.

The symbol for the overload indicator may be a BPSK symbol carrying one information bit, a QPSK symbol carrying two information bits, etc. As shown in equation (1), the 62 symbols for the PSS or SSS may be multiplied with the same symbol for the overload indicator to obtain 62 modulated symbols, which may be mapped to the 62 subcarriers used for the PSS or SSS.

Precoding may be performed with a set of weights to transmit the modulated symbols along a beam, as follows:

$$X(k) = W \cdot B(k), \quad \text{Eq (2)}$$

where $W = [W_1 \ldots W_T]^T$ is a vector of weights for the T physical antennas,
$X(k) = [X_1(k) \ldots X_T(k)]^T$ is a vector of output symbols for the T physical antennas on subcarrier k, and
"T" denotes a transpose.

As shown in equation (2), precoding may be performed to transmit along a beam formed by a linear combination of physical antennas. Precoding may be omitted to transmit directly from the physical antennas without a beam. Precoding may also be performed in other manners, e.g., on OFDM symbols instead of on modulated symbols. One set of 62 output symbols may be generated for each physical antenna by the precoding shown in equation (2). An OFDM symbol may be generated for each physical antenna with the 62 output symbols for that physical antenna mapped to the 62 subcarriers used for the PSS or SSS and possibly other symbols mapped to other subcarriers. Each OFDM symbol may be transmitted from its physical antenna.

A UE may receive the PSS or SSS from the cell. The received symbols for the PSS or SSS (assuming one antenna at the UE) may be expressed as:

$$Y(k) = H_1(k) \cdot W_1 \cdot B(k) + \ldots + H_T(k) \cdot W_T \cdot B(k) + N(k), \quad \text{Eq (3)}$$

where $W_t$ is a weight for physical antenna t, where $t \in \{1, \ldots, T\}$,
$H_t(k)$ is a channel response for physical antenna t on subcarrier k,
$Y(k)$ is a received symbol for subcarrier k, and
$N(k)$ is noise on carrier k.

Equation (3) may be expressed in vector form, as follows:

$$Y(k) = H(k) \cdot W \cdot B(k) + N(k) = H_{eff}(k) \cdot B(k) + N(k), \quad \text{Eq (4)}$$

where $H(k) = [H_1(k) \ldots H_T(k)]$ is a row vector of channel gains, and
$H_{eff}(k)$ is a channel gain for an effective channel on subcarrier k.

The UE may estimate the channel response for each physical antenna based on the reference signal transmitted from that antenna. The UE may obtain $\hat{H}(k)$, which is an estimate of $H(k)$, for each subcarrier k of interest. The UE may also know the weights W for the T physical antennas. The UE may derive a channel estimate for the effective channel based on $\hat{H}(k)$ and W.

In one design, the UE may perform detection based on a minimum mean square error (MMSE) technique, as follows:

$$\hat{B}(k) = \frac{\hat{H}_{eff}^*(k) \cdot Y(k)}{|\hat{H}_{eff}(k)|^2 + \sigma_n^2(k)}, \quad \text{Eq (5)}$$

where $\hat{H}_{eff}(k) = \hat{H}(k) \cdot W$ is an effective channel gain estimate for subcarrier k, $\hat{B}(k)$ is a detected symbol for subcarrier k, which is an estimate of B(k), $\sigma_n^2(k)$ is the variance of the noise N(k), and "*" denotes a complex conjugate.

The UE may also perform detection based on least squares (LS) technique. In this case, the noise variance in equation (5) may be omitted. The UE may also perform detection in other manners. The UE may then process the detected symbols $\hat{B}(k)$ to determine symbol X for the overload indicator.

In another design, the UE may find symbol X that minimizes the error between the actual received symbols at the UE and hypothesized received symbols. When symbol X is a BPSK or QPSK modulation symbol (or more generally, when $|X|^2=1$), the problem reduces to a correlation as follow:

$$C_i = \sum_k [Y(k) - \hat{H}_{\mathit{eff}}(k) \cdot X_i \cdot A(k)]^2 / \sigma^2, \quad \text{Eq (6)}$$

$\sigma^2$ where a is residual noise power in $\hat{B}(k)$, $X_i$ is the i-th possible value of symbol X, and $C_i$ is a correlation result for $X_i$.

The UE typically knows A(k) by the time it attempts to determine the overload indicator. For example, the UE may perform PSS/SSS detection to detect for A(k) in the same manner as a legacy UE that is unaware of the beam used for the PSS/SSS. The UE may perform correlation as shown in equation (6) for each possible value of X The UE may provide the value of $X_i$ that yields the smallest correlation result as the symbol that is most likely to be transmitted.

The UE may also perform detection in other manners. For example, the UE may perform a time or frequency correlation between the symbols for the PSS/SSS and RS with the symbol for the overload indicator, possibly after proper filtering. To reduce hardware complexity, the UE may use hardware components in a searcher and/or a measurement report engine at the UE.

For the first OICH design, UEs that can receive the OICH may perform detection as described above to recover the overload indicator. UEs that cannot receive the OICH (which may be referred to as legacy UEs) may be unaffected by the transmission of the overload indicator on both the PSS and SSS. The legacy UEs would observe an effective weight of $W_t \cdot X$ for each physical antenna. Since the same beam is used for each transmission/instance of the PSS and SSS, the operation of the legacy UEs is unaffected.

In a second OICH design, an overload indicator may be transmitted as a phase difference between consecutive transmissions of the PSS/SSS for a cell. The first transmission of the PSS/SSS may be used as a reference phase. The overload indicator may be transmitted by varying the phase of the second transmission of the PSS/SSS relative to the reference phase. The two transmissions of the PSS/SSS may be sent in subframes 0 and 5 of the same radio frame for LTE FDD.

For the second OICH design, the same beam may be used for a time interval covering at least two consecutive transmissions of the PSS/SSS. A time interval may cover one or more radio frames, and each radio frame may include two transmissions of the PSS and SSS, as shown in FIG. 2. The beam may change from time interval to time interval and may not need to be conveyed to the UEs. For the first transmission, symbols A(k) may be mapped to the 62 subcarriers used for the PSS/SSS. For the second transmission, modulated symbols B(k) may be mapped to the 62 subcarriers used for the PSS/SSS.

A UE may first determine A(k), e.g., using neighbor cell search techniques similar to those used by legacy UEs. The UE may receive the two transmissions of the PSS/SSS from the cell. The UE may process the first transmission of the PSS/SSS and may use its knowledge of A(k) to derive channel gain estimates $\hat{H}_{\mathit{eff}}(k)$ for the effective channel. The UE may process the second transmission of the PSS/SSS to recover symbol X based on the channel gain estimates, e.g., as described above for the first OICH design.

Since the first transmission of the PSS/SSS is used as a phase reference for the second transmission of the PSS/SSS, the two transmissions should be sent as close in time as possible. This may ensure that the channel estimates obtained based on the first transmission of the PSS/SSS are a reasonably accurate estimate of the channel response during the second transmission of the PSS/SSS.

For the first and second OICH designs, the overload indicator is transmitted on the PSS/SSS, which is normally received by UEs. No additional signals and no extra overhead are needed to transmit the overload indicator. Furthermore, transmitting the overload indicator on both the PSS and SSS does not impact the operation of legacy UEs, which may consider symbol X for the overload indicator as part of the beam. For the first OICH design, the beam information may be specified in the standard and/or may be sent infrequently over the air.

For a synchronous system, a UE may receive the PSS and SSS from all cells in the same subframe. For an asynchronous system, the UE may receive the PSS and SSS from each cell based on the frame timing of that cell. The UE may operate with discontinuous reception (DRX). In this case, for an asynchronous system, the UE may receive the overload indicator on only some of the PSS and SSS transmissions in order to reduce its reception time.

In a third OICH design, an overload indicator may be transmitted on resources reserved for transmitting the overload indicator. The reserved resources may comprise one or more resource blocks, a set of resource elements, etc. The overload indicator may be intended for UEs in neighbor cells. The reserved resources may be conveyed to the UEs to enable the UEs to receive the overload indicator.

In a first resource reservation design, some resources in the data region (e.g., some resource elements in the data region of at least one resource block) may be reserved for transmitting the overload indicator. No data may be transmitted on these reserved resources. For LTE, the overload indicator may be transmitted on the PDSCH or some other physical channel in the data region. In a second resource reservation design, some resources in the control region (e.g., some resource elements in the control region) may be reserved for transmitting the overload indicator. No control information may be transmitted on these reserved resources. For LTE, the overload indicator may be transmitted on reserved resources by setting aside some of the PHICH, PDCCH, and/or some other physical channel resources in the control region for this purpose. For both resource reservation designs, the reserved resources may vary across frequency over time to obtain diversity.

In one design, the reserved resources may occupy a small number of subcarriers in a small bandwidth to allow UEs to use smaller inverse fast Fourier transform (IFFT) to process the overload indicator from neighbor cells. In one design, the reserved resources may occupy all or a subset of the 73 subcarriers in the center 1095 KHz of the system bandwidth, or 36 subcarriers on each side of the center/DC subcarrier. This design may allow UEs to receive the overload indicator as well as (i) the PSS and SSS transmitted in the center 945

KHz of the system bandwidth and (ii) the PBCH transmitted in the center 1095 KHz of the system bandwidth.

Figure 5B:
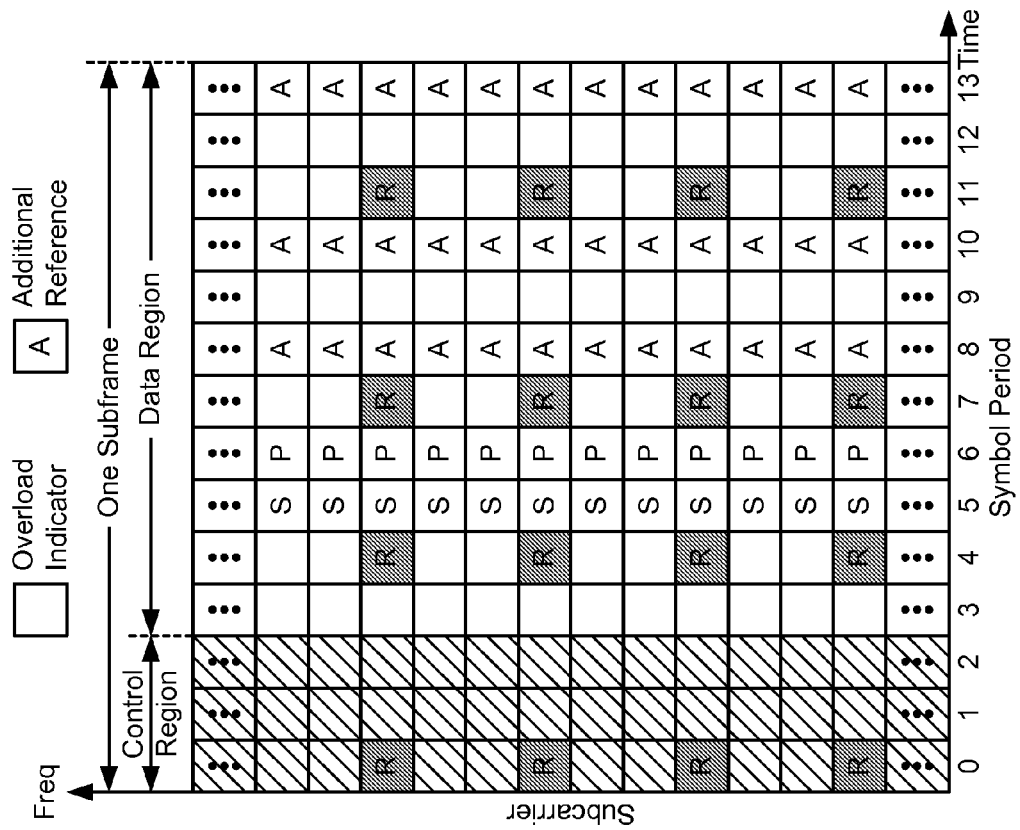
FIGS. 5A and 5B show two designs of reserving resources in a data region of a resource block pair for transmitting an overload indicator.
Figure 5A:
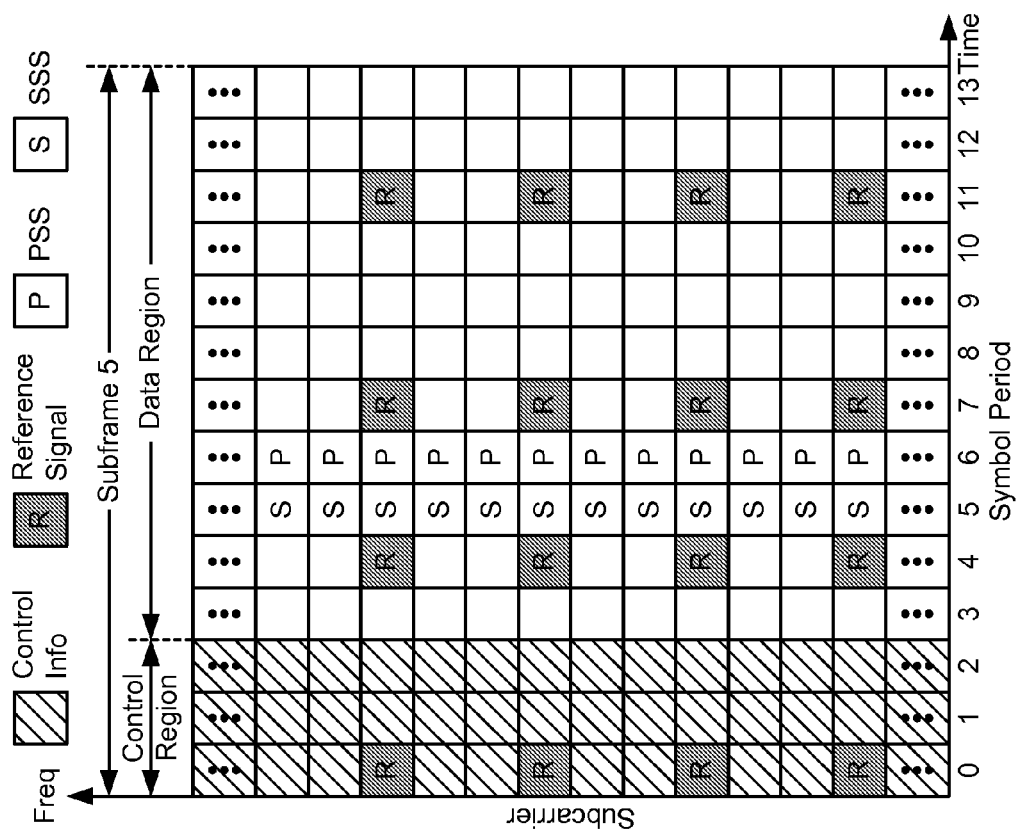

FIG. 5A shows a design of reserving resources in the data region of a pair of resource blocks for transmitting an overload indicator. In this design, the resource block pair is one of the six resource block pairs in which the PSS and SSS are transmitted in the center 945 KHz in subframe 5. The reserved resources may include all resource elements in the data region that are not used for the PSS, the SSS, or the RS. The overload indicator may be transmitted on the reserved resources in the resource block pair. Since the PBCH is not transmitted in subframe 5, more resource elements may be available for transmitting the overload indicator.

FIG. 5B shows another design of transmitting an overload indicator on the reserved resources in a resource block pair. In this design, the reserved resources may include all resource elements in the data region that are not used for the PSS, the SSS, or the RS, as described above for FIG. 5A. Some of the reserved resources may be used to transmit additional reference symbols (labeled as "A" in FIG. 5B), and the remaining reserved resources may be used to transmit the overload indicator. FIG. 5B shows an exemplary set of resource elements used for the additional reference symbols. Other resource elements may also be used to transmit the additional reference symbols. In any case, the additional reference symbols may be used by UEs to derive a more accurate channel estimate, which may improve detection performance.

In a third resource reservation design, unused resource elements near the PSS and SSS and/or unused resource elements in a PBCH region may be reserved for transmitting the overload indicator. This design may allow the overload indicator to be transmitted without consuming any additional resources.

Figure 6A:
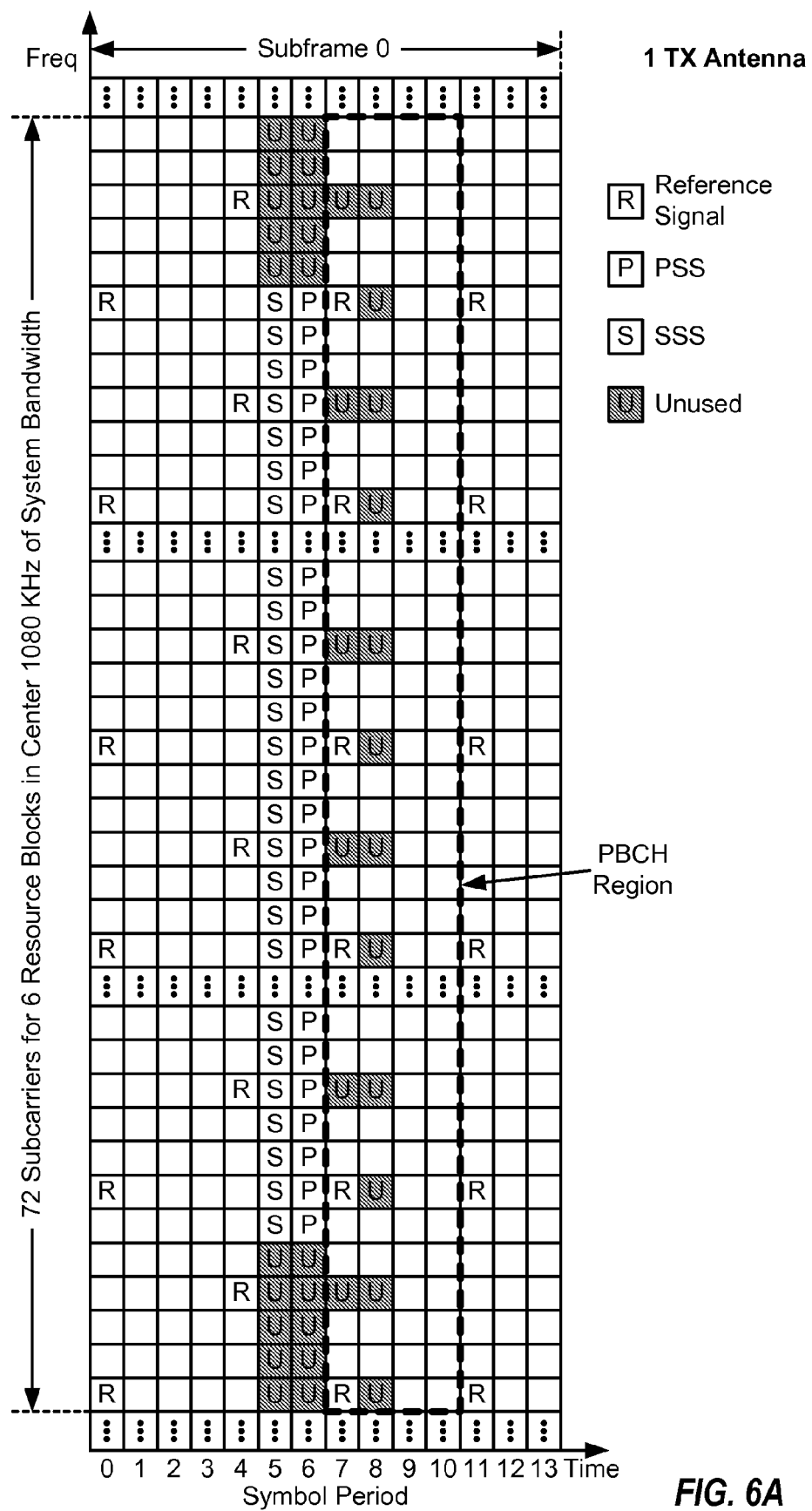
FIGS. 6A and 6B show two designs of reserving unused resource elements for transmitting an overload indicator.

FIG. 6A shows a design of reserving unused resource elements near the PSS and SSS and/or in the PBCH region for transmitting an overload indicator for a case with one physical antenna. FIG. 6A shows three of the six resource block pairs used to transmit the PSS, SSS, and PBCH in subframe 0. These six resource block pairs occupy 36 subcarriers on each side of the center/DC subcarrier, which covers the center 1095 KHz of the system bandwidth. The PSS and SSS are transmitted on the center 62 subcarriers in symbol periods 6 and 5, respectively. Ten unused resource elements (labeled as "U" in FIG. 6A) on both sides of the PSS and SSS in symbol periods 6 and 5 may be reserved for transmitting the overload indicator.

The PBCH region covers the center 72 subcarriers in symbol periods 7 through 10 in subframe 0. The PBCH is transmitted on resource elements without any label in the PBCH region in FIG. 6A. Some resource elements in the PBCH region are used to transmit the RS from antenna 0 and are labeled with "R" in FIG. 6A. Some resource elements in the PBCH region are unused and are labeled with "U" in FIG. 6A. The unused resource elements in the PBCH region may be reserved for transmitting the overload indicator.

Figure 6B:
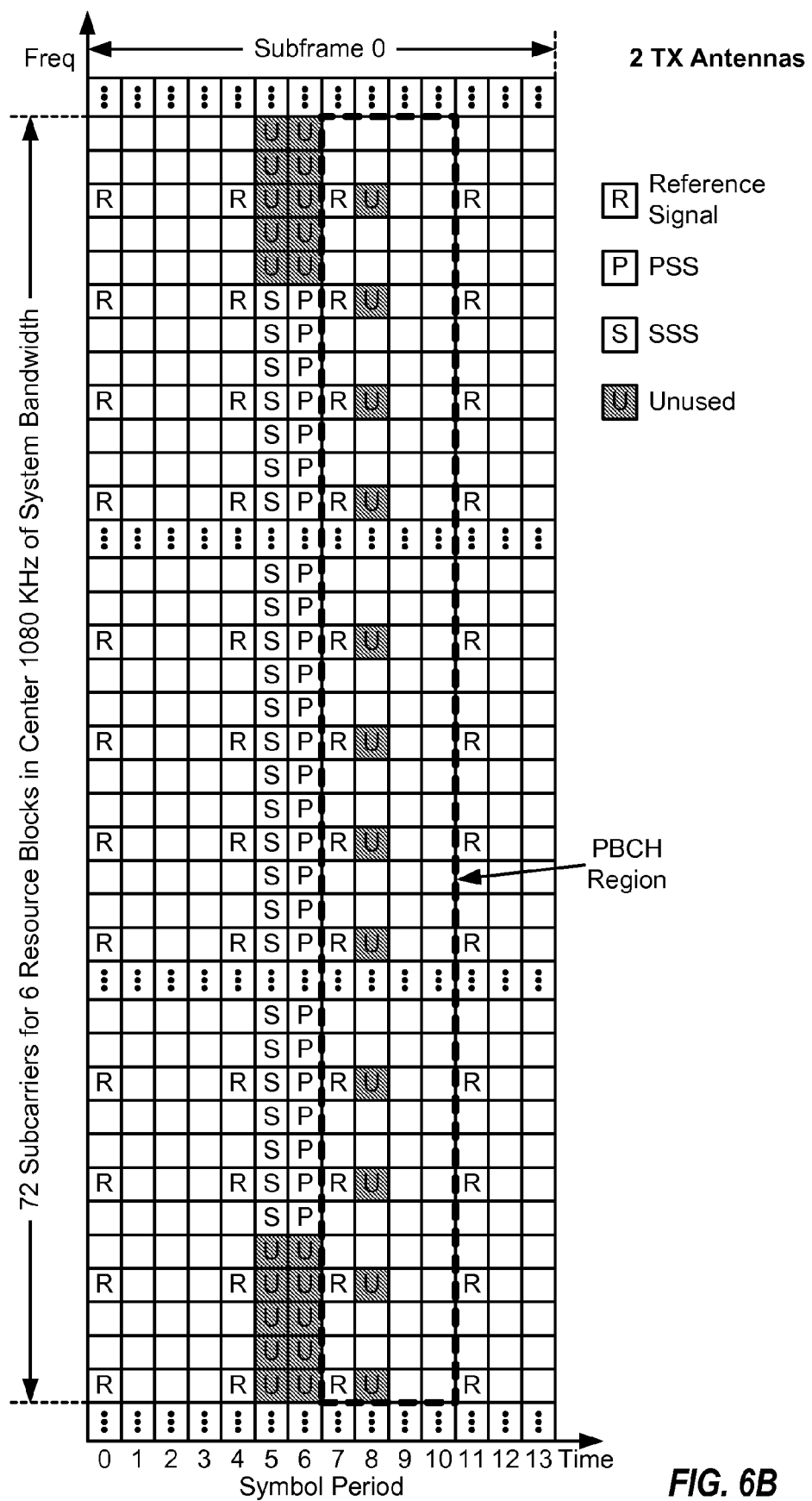

FIG. 6B shows a design of reserving unused resource elements near the PSS and SSS and/or in the PBCH region for transmitting an overload indicator for a case with two physical antennas. The PSS and SSS are transmitted on the center 62 subcarriers in symbol periods 6 and 5, respectively. Ten unused resource elements on both sides of the PSS and SSS may be reserved for transmitting the overload indicator.

The PBCH region covers the center 72 subcarriers in symbol periods 7 through 10 in subframe 0. Some resource elements in the PBCH region are used to transmit the RS from two physical antennas and are labeled with "R" in FIG. 6B. Some resource elements in the PBCH region are unused and are labeled with "U" in FIG. 6B. The unused resource elements in the PBCH region may be reserved for transmitting the overload indicator.

The PBCH region does not include any unused resource elements for the case of four physical antennas. However, the ten unused resource elements on both sides of the PSS and SSS may be reserved for transmitting the overload indicator.

As shown in FIGS. 6A and 6B, at least 20 unused resource elements near the PSS and SSS and in the PBCH region may be reserved for transmitting an overload indicator. For a synchronous system, reuse may be applied, and each cell may transmit its overload indicator on only some of these resource elements. For both synchronous and asynchronous systems, the overload indicator may be transmitted at a higher power level on these resource elements to enable reliable reception by UEs in neighbor cells. Transmitting the overload indicator on the unused resource elements may avoid impact to legacy UEs.

In general, some resources in regular subframes, or multicast/broadcast single frequency network (MBSFN) subframes, or blank subframes, or some other subframes may be reserved for transmitting the overload indicator. MBSFN subframes are subframes normally used to send multicast and/or broadcast data to multiple UEs. An MBSFN subframe may have the RS transmitted in fewer symbol periods, which may allow more of the subframe to be used for other transmissions. A blank subframe includes no mandated transmissions of RS, control information, and data. An advantage of using blank or MBSFN subframes for the overload indicator is that these subframes include fewer or no reference signals, so that a UE attempting to receive the overload indicator from a neighbor cell may observe less interference from its serving cell and other neighbor cells. For example, the serving cell may blank the portion where UEs are expected to receive the overload indicators from neighbor cells or when time and/or frequency reuse is employed. The reserved resources may be static and not changed, or semi-static and changed slowly, or dynamic and changed as often as necessary.

The reserved resources for the overload indicator may be conveyed to the UEs in various manners. For example, the reserved resources may be conveyed via the PSS, the SSS, the PBCH, and/or other signals and channels. In one design, a cell may convey its reserved resources (which may be used by the cell to transmit its overload indicator) to UEs in neighbor cells via the PSS and/or the SSS (which may have wider coverage) or via the PBCH (which may have smaller coverage). In another design, a cell may convey reserved resources for neighbor cells (which may be used by the neighbor cells to transmit their overload indicators) to UEs served by the cell via the PSS, the SSS, the PBCH, etc. In general, a UE may be able to determine resources reserved by the neighbor cells to transmit their overload indicators based on any suitable signal or channel transmitted by the neighbor cells and/or the serving cell.

A cell may transmit an overload indicator on the reserved resources in various manners. In one design, the overload indicator may be mapped to a pseudo-random sequence among a set of possible pseudo-random sequences. The pseudo-random sequence may then be mapped to the reserved resources. In another design, the overload indicator may be encoded and symbol mapped to a set of symbols, where each symbol may be a real or complex value. The symbols may be mapped to the reserved resources.

In one design, the overload indicator may be transmitted with precoding using the same beam used for the PSS and SSS. This design may allow a UE to use the PSS/SSS as a phase reference for detecting the overload indicator. The use of the PSS/SSS (instead of the RS) as a phase reference for the overload indicator may allow the UE to obtain a single channel estimate for the effective channel even if the cell has more than one physical antenna. This may minimize channel estimation losses, which may be especially severe at low received signal quality. The additional reference symbols (e.g., as shown in FIG. 5B) may further improve channel estimation performance, which may then improve detection performance. In another design, the overload indicator may be transmitted without precoding. For this design, a UE may derive a channel estimate based on the RS (instead of the PSS/SSS). In yet another design, the overload indicator may be transmitted with precoding for a beam that is known to the UEs but may be different from a beam used for the PSS and SSS. This design may allow a cell to independently control the beam for the PSS and SSS and the beam for the overload indicator. A UE may derive a channel estimate based on the RS and the known beam for the overload indicator. For all designs, the additional reference symbols may be transmitted in the same manner as the overload indicator (e.g., with or without precoding).

A cell may transmit an overload indicator on the reserved resources in a manner to allow the UEs to recover the overload indicator from the cell. If multiple cells can transmit their overload indicators on the same resources, then each cell may transmit its overload indicator such that the UEs can identify the sender of the overload indicator. For example, each cell may scramble its overload indicator with a scrambling sequence assigned to the cell, e.g., a scrambling sequence generated based on the cell ID. In this case, the UEs may determine the cell ID of a cell prior to receiving the overload indicator from the cell. The cell ID may be obtained from the PSS and SSS transmitted by the cell, from a neighbor cell list transmitted by the serving cell, or from other sources.

A cell may transmit its overload indicator on the reserved resources at any suitable rate. If the overload indicator is transmitted at a sufficiently fast rate (e.g., in every subframe), then a UE may operate with DRX and may receive the overload indicator only some of the time (instead of each transmission of the overload indicator). The cell may also transmit the overload indicator at higher transmit power relative to the transmit power for data (i.e., with power boosting) to achieve deeper penetration in neighbor cells. The cell may also transmit the overload indicator on the reserved resources in addition to transmitting the overload indicator on the PSS/SSS. Thus, the third OICH design may be used in combination with the first or second OICH design.

In a fourth OICH design, an overload indicator may be transmitted on a low reuse channel that may observe less interference from neighbor cells. Some resources may be reserved for the low reuse channel. Each cell may transmit its low reuse channel on some of the reserved resources. The low reuse channel may carry the overload indicator and possibly other information such as cell ID, master information block (MIB), etc.

The low reuse channel may be transmitted with a reuse factor greater than one, so that only a fraction of the cells transmit their low reuse channels on a given resource. For example, with a reuse factor of M, where M>1, only one out of every M cells may transmit its low reuse channel on a given resource. The low reuse channel from a given cell may observe less interference from other cells, which may enable reception of the low reuse channel by more UEs. Transmissions on the low reuse channel may also be randomized in order to avoid situations where transmissions from a strong interfering cell always collide with transmissions from a weaker desired cell.

In one design, the low reuse channel may comprise a low reuse preamble/pilot (LRP), which may have wider coverage and better hearability than the RS. An LRP may also be referred to as a positioning assistance reference signal (PA-RS), a highly detectable pilot (HDP), etc. The overload indicator may be mapped to one or more symbols, which may be sent on the LRP. For example, the overload indicator may be mapped to a single symbol, which may be used to modulate each symbol for the LRP, e.g., as shown in equation (1).

In another design, the low reuse channel carrying the overload indicator may be transmitted on guard subcarriers. A total of $N_{FFT}$ subcarriers may be obtained from OFDM or SC-FDM, but only a subset of these $N_{FFT}$ subcarriers may be used for transmission. The remaining subcarriers, which may be located near the two edges of the system bandwidth, may be left unused and may serve as guard subcarriers to allow the system to meet spectral emission requirements. Some or all of the guard subcarriers may be used for the low reuse channel. Random reuse may be employed, and each cell may randomly select a set of subcarriers to transmit its low reuse channel.

In a variation of the fourth OICH design, an overload indicator may be transmitted on the PBCH. This may be achieved in several manners. In a first PBCH design, a cell may transmit its overload indicator on its PBCH to UEs in neighbor cells. For this design, a UE may process the PBCHs of neighbor cells to obtain the overload indicators for these cells. The UE may then control its operation and/or perform other actions based on the overload indicators for the neighbor cells. This design may provide good processing gain but lower coverage due to transmission of the overload indicator on the PBCH. Furthermore, the periodicity of the overload indicator would be dependent on the periodicity of the PBCH, which is 40 ms for LTE.

In a second PBCH design, a cell may transmit overload indicators for neighbor cells on the PBCH of the cell. The cell may receive the overload indicators for the neighbor cells, e.g., via the backhaul. The cell may transmit these overload indicators on the PBCH to its UEs. The PBCH may be defined with one or more fields to carry one or more overload indicators for one or more neighbor cells. The UEs within the coverage of the cell may process the PBCH of the cell to obtain the overload indicators for the neighbor cells. These UEs may then control their operation and/or perform other actions based on the overload indicators for the neighbor cells.

For the first PBCH design, a UE may receive the PBCHs of neighbor cells in order to obtain the overload indicators for these cells. The PBCH from each cell may be intended for UEs in that cell and possibly strong UEs in neighbor cells and may thus have limited penetration. The UE may process the PBCHs for the neighbor cells using interference cancellation in order to improve detection performance. For interference cancellation, the UE may process a received signal to recover the PBCH for one (e.g., the strongest) neighbor cell at a time. Upon correctly decoding the PBCH for one neighbor cell, the UE may estimate the interference due to the PBCH, subtract the estimated interference from the received signal, and process the interference-canceled signal to recover the PBCH for another neighbor cell.

Various designs for transmitting an overload indicator have been described above. The overload indicator may also be transmitted in other manners. The overload indicator may be transmitted in a manner to avoid or minimize changes to existing signals and channels in LTE Release 8. The overload indicator may also be transmitted in a manner to allow UEs to receive the overload indicators from (i) synchronous and asynchronous cells and (ii) very weak neighbor cells with low received signal quality. For example, the overload indicator may have penetration similar to (or better than) that of the PSS and SSS. The overload indicator may also be transmitted at a suitable periodicity (e.g., in the range of 5 to 30 ms), which may be selected to achieve a good compromise between performance (which may favor higher periodicity) and overhead (which may favor lower periodicity). The overload indicator may be transmitted in each radio frame for a periodicity of 10 ms. The overload indicators for different cells may be transmitted at time-frequency locations that may vary from time to time to avoid repeated collisions of the overload indicators from these cells at the UEs.

An overload indicator may also be transmitted in a manner to impose minimal additional complexity on a UE for detection of the overload indicator. This may be achieved by transmitting the overload indicator using existing signals (e.g., the SSS). This may also be achieved by transmitting the overload indicator in the center six resource block pairs, which may already be monitored by the UEs for detecting new cells and tracking detected cells.

An overload indicator may be transmitted in a manner such that detection of the overload indicator has as little impact as possible on battery life of UEs operating with DRX. This may be achieved by transmitting the overload indicator in subframe 0 and/or 5, since the UEs may already be monitoring these subframes for cell detection and tracking. Since the PBCH is transmitted in subframe 0 and not subframe 5, subframe 5 may have more resource elements that may be used for the overload indicator. The periodicity of the overload indicator may be larger than or equal to 20 ms to avoid transmissions of system information block 1 (SIB1) in subframe 5.

The system may support operation on multiple carriers, and each carrier may be defined by a specific frequency range and a specific center frequency. In one design, an overload indicator may be transmitted by a cell on a given downlink carrier and may control transmission of UEs on one or more uplink carriers. In another design, multiple overload indicators covering different uplink carriers may be transmitted on the same or different downlink carriers. When multiple overload indicators are transmitted on one downlink carrier, the overload indicators may be transmitted on different resources (e.g., different resource blocks). An overload indicator may also be used to control interference caused by Adjacent Carrier Leakage Ratio (ACLR), which may result when a UE transmitting on one carrier causes interference on an adjacent carrier. The same overload indicator or different overload indicators may be used to control co-channel interference and ACLR.

A UE in DRX may monitor only a subset of all transmissions of an overload indicator in order to reduce impact on battery life. The UE in DRX may also ignore all transmissions of the overload indicator, e.g., if the UE is not allowed to transmit on the uplink in the DRX mode. In this case, the serving cell may assign a conservative initial transmit power level (e.g., based on open loop projection) for any uplink transmission that occurs after a long DRX cycle.

A UE may monitor overload indicators from multiple neighbor cells with similar (but possibly asynchronous) timing. The UE may receive only some of the transmissions of the overload indicators from different cells via subsampling. The UE may control its transmission to account for subsampling. For example, the UE may adjust its transmit power by apply additional step sizes to account for missed overload indicators due to subsampling.

FIG. 7 shows a design of a process 700 for transmitting an overload indicator based on the first OICH design. Process 700 may be performed by a cell (e.g., a base station/eNB for the cell) or by some other entity. The cell may determine an overload indicator based on its loading (block 712). The cell may transmit a reference signal that may be used by UEs for channel estimation and/or other purposes (block 714). The cell may transmit at least one synchronization signal comprising the overload indicator for the cell (block 716). The at least one synchronization signal may be used by the UEs for cell acquisition and/or other purposes and may comprise a primary synchronization signal and/or a secondary synchronization signal. The overload indicator may be transmitted on the at least one synchronization signal, and the reference signal may be used as a phase reference.

In one design, the at least one synchronization signal may be transmitted with precoding along a beam, and the reference signal may be transmitted without precoding. The cell may transmit information indicative of the precoding or beam used for the at least one synchronization signal. Alternatively, the precoding or beam may be specified and known a priori by the UEs.

In one design, the cell may generate a plurality of symbols for a synchronization signal among the at least one synchronization signal. The cell may generate a symbol for the overload indicator. The cell may multiply the plurality of symbols for the synchronization signal with the symbol for the overload indicator to obtain a plurality of modulated symbols, e.g., as shown in equation (1). The cell may then generate the synchronization signal based on the plurality of modulated symbols (instead of the plurality of symbols).

In one design, the overload indicator may comprise at least one bit indicative of the loading of the cell. For example, the overload indicator may indicate whether the cell observes heavy loading. The overload indicator may be transmitted on a downlink carrier and may indicate loading of at least one uplink carrier associated with the downlink carrier.

FIG. 8 shows a design of an apparatus 800 for transmitting an overload indicator. Apparatus 800 includes a module 812 to determine an overload indicator for a cell, a module 814 to transmit a reference signal for the cell, and a module 816 to transmit at least one synchronization signal comprising the overload indicator for the cell. The overload indicator may be transmitted on the at least one synchronization signal, and the reference signal may be used as a phase reference.

FIG. 9 shows a design of a process 900 for transmitting an overload indicator based on the second OICH design. Process 900 may be performed by a cell or by some other entity. The cell may determine an overload indicator based on its loading (block 912). The cell may send a first transmission of at least one synchronization signal (e.g., the PSS and/or SSS) in a first time period (block 914). The cell may send a second transmission of the at least one synchronization signal comprising the overload indicator in a second time period (block 916). The overload indicator may be conveyed by a phase difference between the second transmission and the first transmission of the at least one synchronization signal. In one design, for LTE, the first time period may correspond to subframe 0 of a radio frame, and the second time period may correspond to subframe 5 of the radio frame.

In one design, the cell may generate a plurality of symbols for a synchronization signal among the at least one synchronization signal. The cell may generate a symbol for the overload indicator. The cell may multiply the plurality of symbols for the synchronization signal with the symbol for the overload indicator to obtain a plurality of modulated symbols. The cell may generate the first transmission of the synchronization signal based on the plurality of symbols. The cell may generate the second transmission of the synchronization signal based on the plurality of modulated symbols. The cell may send the first and second transmissions of the at least one synchronization signal with precoding for a beam that may be used for both transmissions.

FIG. 10 shows a design of an apparatus 1000 for transmitting an overload indicator. Apparatus 1000 includes a module 1012 to determine an overload indicator for a cell, a module 1014 to send a first transmission of at least one synchronization signal for the cell in a first time period, and a module 1016 to send a second transmission of the at least one synchronization signal comprising the overload indicator in a second time period. The overload indicator may be conveyed by a phase difference between the second transmission and the first transmission of the at least one synchronization signal.

FIG. 11 shows a design of a process 1100 for transmitting an overload indicator based on the third OICH design. Process 1100 may be performed by a cell or by some other entity. The cell may determine an overload indicator based on its loading (block 1112). The cell may determine resources reserved for transmitting the overload indicator (block 1114). In one design, the reserved resources comprise resource elements in a data region of at least one resource block. In another design, the reserved resources may comprise resource elements in a control region of at least one resource block. In yet another design, the reserved resources may comprise unused resource elements in at least one resource block. For all designs, the cell may transmit the overload indicator on the reserved resources to UEs in neighbor cells (block 1116).

The cell may transmit at least one synchronization signal in a center portion of the system bandwidth. The reserved resources may comprise resource elements in the center portion of the system bandwidth, which may simplify reception of the overload indicator by the UEs. The cell may transmit the at least one synchronization signal in designated subframes (e.g., subframes 0 and 5) among available subframes. The reserved resources may comprise resource elements in all or a subset of the designated subframes, which may reduce reception time for the UEs since they may normally receive the at least one synchronization signal. The cell may transmit the at least one synchronization signal in at least one symbol period. The reserved resources comprise unused resource elements in the at least one symbol period.

The cell may transmit a broadcast channel on a first set of resource elements in a broadcast region (e.g., the PBCH region) and may transmit a reference signal on a second set of resource elements in the broadcast region. The broadcast region may cover a plurality of subcarriers in a plurality of symbol periods. The reserved resources may comprise resource elements in the broadcast region that are not used for the broadcast channel or the reference signal.

In one design, the cell may transmit the at least one synchronization signal with precoding and may also transmit the overload indicator with precoding. The at least one synchronization signal may provide a phase reference for the overload indicator. In another design, the cell may transmit the overload indicator without precoding. The cell may transmit a reference signal that may provide a phase reference for the overload indicator. The cell may also transmit an additional reference signal.

FIG. 12 shows a design of an apparatus 1200 for transmitting an overload indicator. Apparatus 1200 includes a module 1212 to determine an overload indicator for a cell, a module 1214 to determine resources reserved for transmitting the overload indicator, and a module 1216 to transmit the overload indicator for the cell on the reserved resources to UEs in neighbor cells.

FIG. 13 shows a design of a process 1300 for transmitting an overload indicator based on the fourth OICH design. Process 1300 may be performed by a cell or by some other entity. The cell may determine an overload indicator based on its loading (block 1312). The cell may transmit the overload indicator on a low reuse channel or a broadcast channel to UEs in neighbor cells (block 1314). The cell may also obtain at least one overload indicator for at least one neighbor cell and may transmit the at least one overload indicator on the low reuse channel or the broadcast channel.

The low reuse channel may be transmitted with a reuse factor greater than one, so that only a fraction of the cells transmit their low reuse channels on a given resource and hence cause less interference. In one design, the low reuse channel may comprise a low reuse preamble that may be transmitted with a reuse factor greater than one. In another design, the low reuse channel may be transmitted on reserved resources with low reuse. The reserved resources may occupy guard subcarriers, which may not be used for transmission of data and control information. The cell may randomly select some of the reserved resources for transmitting the low reuse channel and may transmit the low reuse channel on the selected resources.

FIG. 14 shows a design of an apparatus 1400 for transmitting an overload indicator. Apparatus 1400 includes a module 1412 to determine an overload indicator for a cell, and a module 1414 to transmit the overload indicator for the cell on a low reuse channel or a broadcast channel to UEs in neighbor cells.

Figure 15:
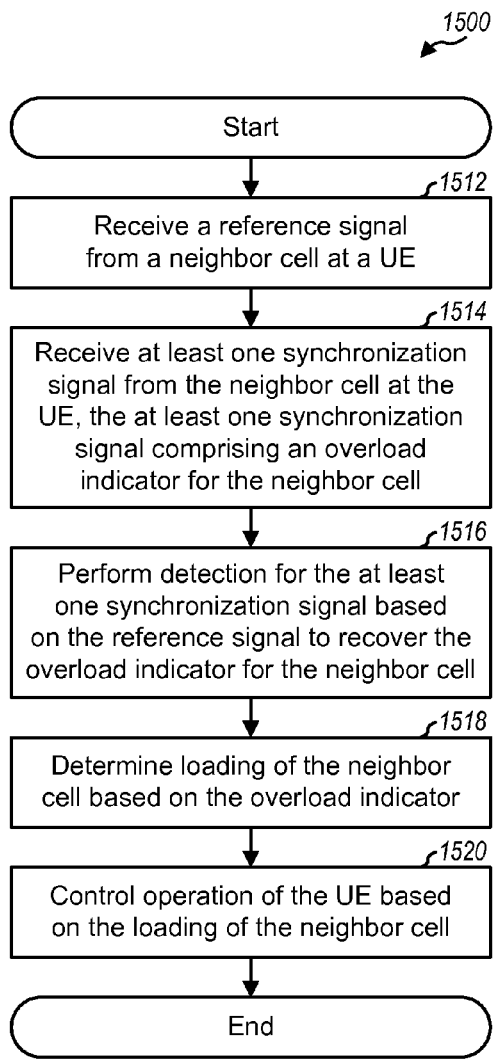

FIG. 15 shows a design of a process 1500 for receiving overload indicators transmitted based on the first OICH design. Process 1500 may be performed by a UE (as described below) or by some other entity. The UE may communicate with a serving cell. The UE may receive a reference signal from a neighbor cell (block 1512). The UE may also receive at least one synchronization signal (e.g., the PSS and/or SSS) from the neighbor cell (block 1514). The at least one synchronization signal may comprise an overload indicator for the neighbor cell.

The UE may perform detection for the at least one synchronization signal based on the reference signal to recover the overload indicator for the neighbor cell (block 1516). In one design, the UE may derive a channel estimate for the neighbor cell based on the reference signal. The UE may then perform detection for the at least one synchronization signal based on the channel estimate to recover the overload indicator for the neighbor cell. The at least one synchronization signal may be transmitted with precoding, and the reference signal may be transmitted without precoding. In this case, the UE may derive an effective channel estimate for the neighbor cell based on the channel estimate and the weights for the precoding. The UE may then perform detection for the at least one synchronization signal based on the effective channel estimate, e.g., as shown in equation (5) or (6).

The UE may determine loading of the neighbor cell based on the overload indicator (block 1518). The UE may control its operation based on the loading of the neighbor cell (block 1520). For example, the UE may adjust its transmit power, or skip one or more transmissions, or avoid transmitting on one or more resources, and/or perform other actions based on the loading of the neighbor cell. Alternatively or additionally, the UE may determine feedback information based on the overload indicator for the neighbor cell. The UE may send the feedback information to the serving cell, which may perform appropriate corrective actions.

Figure 16:
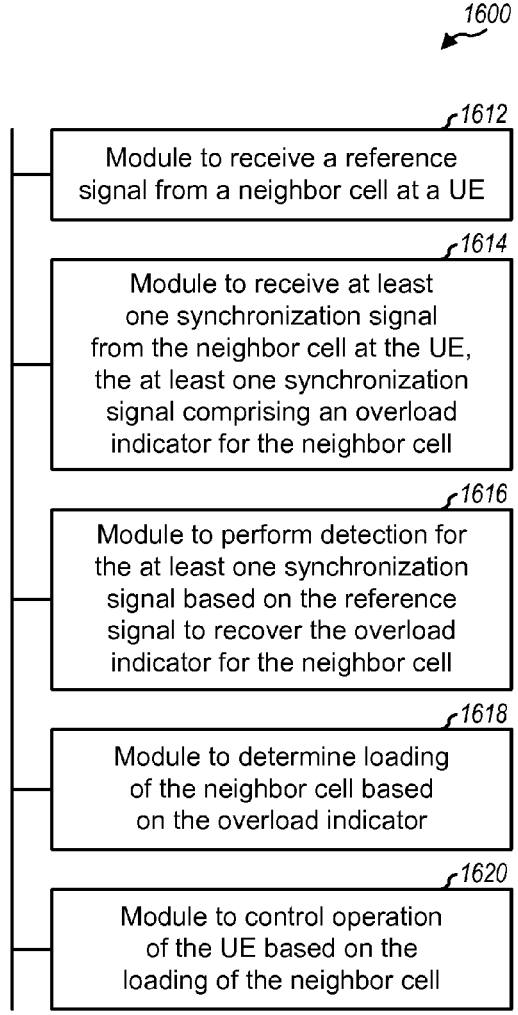

FIG. 16 shows a design of an apparatus 1600 for receiving overload indicators. Apparatus 1600 includes a module 1612 to receive a reference signal from a neighbor cell at a UE, a module 1614 to receive at least one synchronization signal from the neighbor cell at the UE, with the at least one synchronization signal comprising an overload indicator for the neighbor cell, a module 1616 to perform detection for the at least one synchronization signal based on the reference signal to recover the overload indicator for the neighbor cell, a module 1618 to determine loading of the neighbor cell based on the overload indicator, and a module 1620 to control operation of the UE based on the loading of the neighbor cell.

Figure 17:
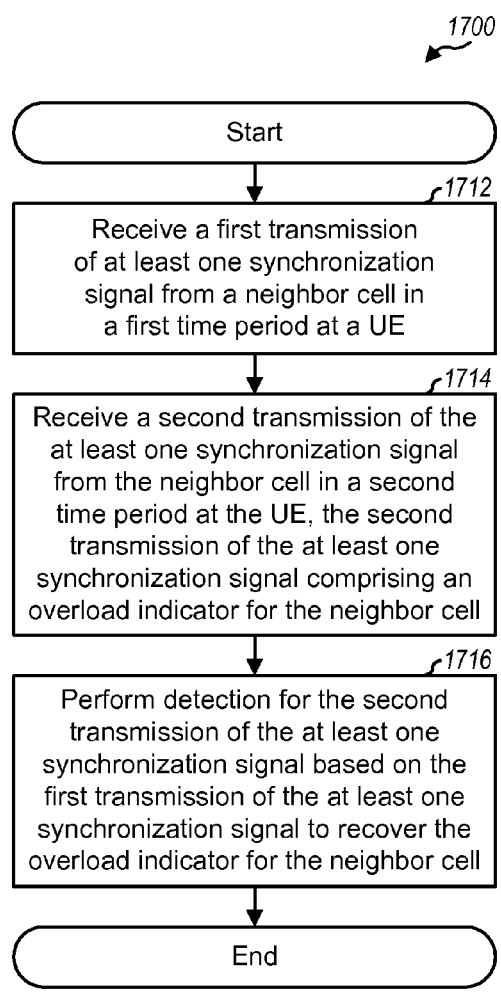

FIG. 17 shows a design of a process 1700 for receiving overload indicators transmitted based on the second OICH design. Process 1700 may be performed by a UE or by some other entity. The UE may receive a first transmission of at least one synchronization signal (e.g., the PSS and/or SSS) from a neighbor cell in a first time period (block 1712). The UE may receive a second transmission of the at least one synchronization signal from the neighbor cell in a second time period (block 1714). The second transmission of the at least one synchronization signal may comprise an overload indicator for the neighbor cell. The UE may perform detection for the second transmission of the at least one synchronization signal based on the first transmission of the at least one synchronization signal to recover the overload indicator for the neighbor cell (block 1716). For example, the UE may derive a channel estimate for the neighbor cell based on the first transmission of the at least one synchronization signal. The UE may then perform detection for the second transmission of the at least one synchronization signal based on the channel estimate to recover the overload indicator for the neighbor cell.

The UE may determine loading of the neighbor cell based on the overload indicator and may control its operation based on the loading of the neighbor cell. The UE may also determine feedback information based on the overload indicator and may send the feedback information to the serving cell.

Figure 18:
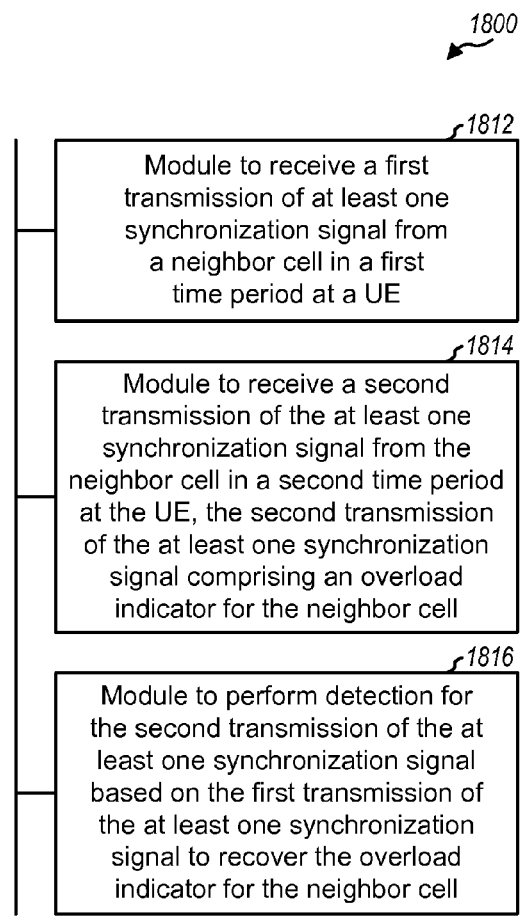

FIG. 18 shows a design of an apparatus 1800 for receiving overload indicators. Apparatus 1800 includes a module 1812 to receive a first transmission of at least one synchronization signal from a neighbor cell in a first time period at a UE, a module 1814 to receive a second transmission of the at least one synchronization signal from the neighbor cell in a second time period at the UE, the second transmission of the at least one synchronization signal comprising an overload indicator for the neighbor cell, and a module 1816 to perform detection for the second transmission of the at least one synchronization signal based on the first transmission of the at least one synchronization signal to recover the overload indicator for the neighbor cell.

FIG. 19 shows a design of a process 1900 for receiving overload indicators transmitted based on the third OICH design. Process 1900 may be performed by a UE or by some other entity. The UE may determine resources reserved for transmitting an overload indicator for a neighbor cell (block 1912). The reserved resources may comprise (i) resource elements in a data region of at least one resource block, (ii) resource elements in a control region of at least one resource block, (iii) unused resource elements in at least one resource block, and/or (iv) other resource elements. The UE may receive the overload indicator for the neighbor cell on the reserved resources (block 1914). The UE may receive each transmission of the overload indicator for the neighbor cell or may receive only a subset of all transmissions of the overload indicator in order to reduce reception time for the UE.

In one design that is shown in FIG. 19, the UE may receive at least one synchronization signal transmitted by the neighbor cell with precoding (block 1916). The overload indicator may also be transmitted by the neighbor cell with precoding. The UE may derive a channel estimate for the neighbor cell based on the at least one synchronization signal (block 1918). The UE may then perform detection based on the channel estimate to recover the overload indicator for the neighbor cell (block 1920).

In another design that is not shown in FIG. 19, the UE may receive a reference signal and possibly an additional reference signal from the neighbor cell. The UE may derive a channel estimate for the neighbor cell based on the reference signal(s). The UE may then perform detection based on the channel estimate to recover the overload indicator for the neighbor cell. The overload indicator may or may not be transmitted by the neighbor cell with precoding. If the overload indicator is transmitted with precoding, then the UE may derive an effective channel estimate based on the channel estimate and the weights for the precoding. The UE may then perform detection with the effective channel estimate, e.g., as shown in equation (5) or (6).

The UE may determine loading of the neighbor cell based on the overload indicator and may control its operation based on the loading of the neighbor cell. The UE may also determine feedback information based on the overload indicator and may send the feedback information to the serving cell.

FIG. 20 shows a design of an apparatus 2000 for receiving overload indicators. Apparatus 2000 includes a module 2012 to determine resources reserved for transmitting an overload indicator for a neighbor cell, a module 2014 to receive the overload indicator for the neighbor cell on the reserved resources at a UE, a module 2016 to receive at least one synchronization signal transmitted by the neighbor cell with precoding, wherein the overload indicator is transmitted by the neighbor cell with precoding, a module 2018 to derive a channel estimate for the neighbor cell based on the at least one synchronization signal, and a module 2020 to perform detection based on the channel estimate to recover the overload indicator for the neighbor cell.

Figure 21:
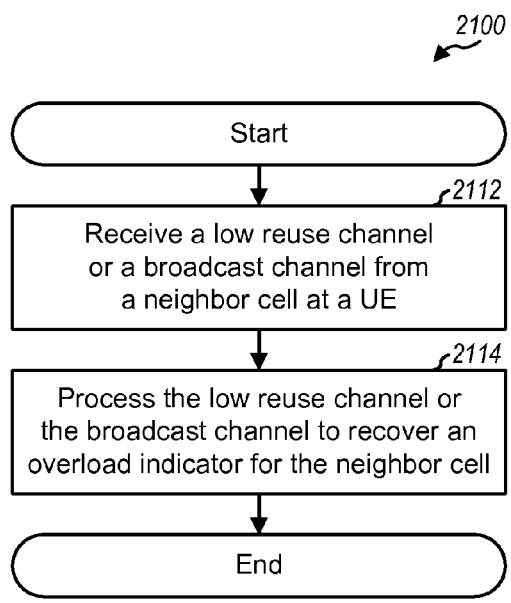

FIG. 21 shows a design of a process 2100 for receiving overload indicators transmitted based on the fourth OICH design. Process 2100 may be performed by a UE or by some other entity. The UE may receive a low reuse channel or a broadcast channel from a neighbor cell (block 2112). The UE may process the low reuse channel or the broadcast channel to recover an overload indicator for the neighbor cell (block 2114). The low reuse channel may be transmitted with a reuse factor greater than one and may observe less interference from other cells. The low reuse channel may comprise a low reuse preamble or may be sent on reserved resources (e.g., guard subcarriers) with low reuse.

The UE may determine loading of the neighbor cell based on the overload indicator and may control its operation based on the loading of the neighbor cell. The UE may also determine feedback information based on the overload indicator and may send the feedback information to the serving cell.

Figure 22:
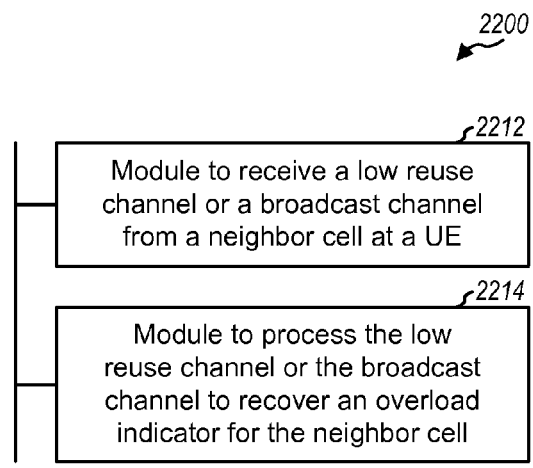

FIG. 22 shows a design of an apparatus 2200 for receiving overload indicators. Apparatus 2200 includes a module 2212 to receive a low reuse channel or a broadcast channel from a neighbor cell at a UE, and a module 2214 to process the low reuse channel or the broadcast channel to recover an overload indicator for the neighbor cell.

Figure 23:
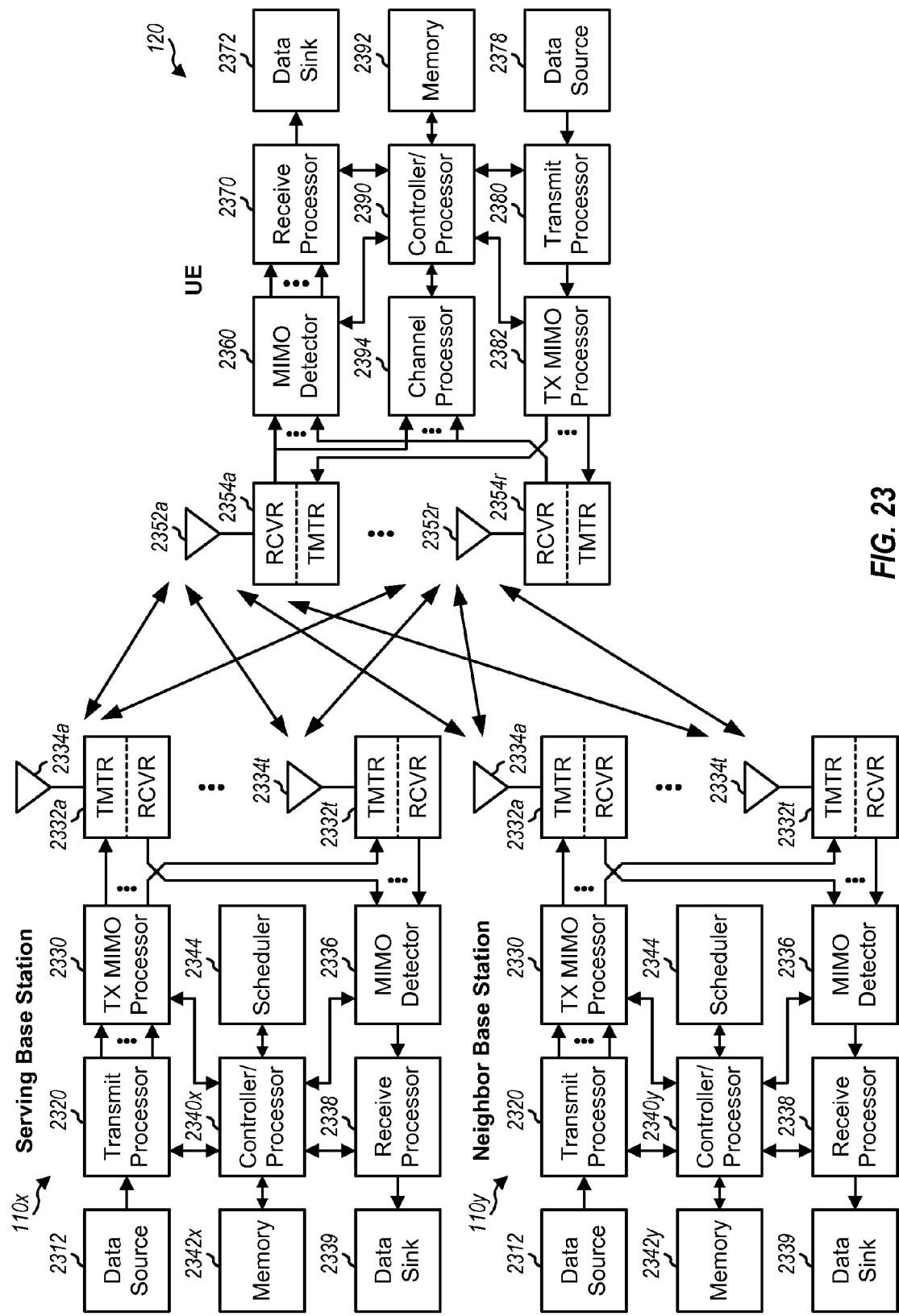
FIG. 23 shows a block diagram of a UE and two base stations.

The modules in FIGS. 8, 10, 12, 14, 16, 18, 20 and 22 may comprise processors, electronic devices, hardware devices, electronic components, logical circuits, memories, software codes, firmware codes, etc., or any combination thereof FIG. 23 shows a block diagram of a design of a UE 120 and two base stations/eNBs 110x and 110y, which may be one of the UEs and two of the base stations/eNBs in FIG. 1. Each base station may be equipped with T antennas, where T≥1, and UE 120 may be equipped with R antennas, where R≥1. Each base station may serve one or more cells. Base station 110x may include a serving cell for UE 120, and base station 110y may include one or more neighbor cells for UE 120.

At each base station 110, a transmit processor 2320 may receive data for one or more UEs from a data source 2312, process (e.g., encode and modulate) the data for each UE based on one or more modulation and coding schemes, and provide data symbols for all UEs. Transmit processor 2320 may also receive control information from a controller/processor 2340, process the control information, and provide control symbols. The control information may comprise an overload indicator for each cell served by base station 110. Transmit processor 2320 may also generate reference symbols for reference signals and synchronization signals for each cell served by base station 110. A transmit (TX) multiple-input multiple-output (MIMO) processor 2330 may perform spatial processing (e.g., precoding or beamforming) on the data symbols, the control symbols, and/or the reference symbols, if applicable, and may provide T output symbol streams to T transmitters (TMTR) 2332a through 2332t. Each transmitter 2332 may process a respective output symbol stream (e.g., for OFDM, etc.) to obtain an output sample stream. Each transmitter 2332 may further process (e.g., convert to analog, amplify, filter, and upconvert) the output sample stream to obtain a downlink signal. T downlink signals from transmitters 2332a through 2332t may be transmitted via T antennas 2334a through 2334t, respectively.

At UE 120, R antennas 2352a through 2352r may receive the downlink signals from serving base station 110x, neighbor base station 110y, and possibly other base stations and may provide received signals to receivers (RCVR) 2354a through 2354r, respectively. Each receiver 2354 may condition (e.g., filter, amplify, downconvert, and digitize) its received signal to obtain received samples and may further process the received samples (e.g., for OFDM, etc.) to obtain received symbols. A MIMO detector 2360 may perform detection on the received symbols from all R receivers 2354a through 2354r based on a channel estimate from a channel processor 2394 and may provide detected symbols. Channel processor 2394 may derive the channel estimate based on the reference signals and/or the synchronization signals. A receive processor 2370 may process (e.g., symbol demap and decode) the detected symbols, provide decoded data for UE 120 to a data sink 2372, and provide decoded control information (e.g., overload indicators for neighbor cells) to a controller/processor 2390. Processor 2390 may control the operation of UE 120 based on the overload indicators for neighbor cells, e.g., as described above.

On the uplink, at UE 120, data from a data source 2378 and control information from controller/processor 2390 may be processed by a transmit processor 2380, precoded by a TX MIMO processor 2382 (if applicable), conditioned by transmitters 2354a through 2354r, and transmitted via antennas 2352a through 2352r. At base station 110, the uplink signals from UE 120 and other UEs may be received by antennas 2334, conditioned by receivers 2332, detected by a MIMO detector 2336, and processed by a receive processor 2338 to obtain the data and control information transmitted by UE 120 and other UEs.

Controllers/processors 2340x, 2340y, and 2390 may direct the operation at base stations 110x and 110y and UE 120, respectively. Processor 2340 and/or other processors and modules at each base station 110 may perform or direct process 700 in FIG. 7, process 900 in FIG. 9, process 1100 in FIG. 11, process 1300 in FIG. 13, and/or other processes for the techniques described herein. Processor 2390 and/or other processors and modules at UE 120 may perform or direct process 1500 in FIG. 15, process 1700 in FIG. 17, process 1900 in FIG. 19, process 2100 in FIG. 21, and/or other processes for the techniques described herein. Memories 2342x, 2342y and 2392 may store data and program codes for base stations 110x and 110y and UE 120, respectively. A scheduler 2344 at each base station 110 may schedule UEs for transmission on the downlink and/or uplink and may assign resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining an overload indicator for a cell;
   transmitting a reference signal for the cell; and
   transmitting at least one synchronization signal comprising the overload indicator for the cell, wherein the overload indicator is transmitted on the at least one synchronization signal and the reference signal is used as a phase reference.

2. The method of claim 1, wherein the at least one synchronization signal is transmitted with precoding and the reference signal is transmitted without precoding, the method further comprising:
   transmitting information indicative of the precoding used for the at least one synchronization signal.

3. The method of claim 1, further comprising:
   generating a plurality of symbols for a synchronization signal among the at least one synchronization signal;
   generating a symbol for the overload indicator;
   multiplying the plurality of symbols for the synchronization signal with the symbol for the overload indicator to obtain a plurality of modulated symbols; and
   generating the synchronization signal based on the plurality of modulated symbols.

4. The method of claim 1, wherein the at least one synchronization signal comprises a primary synchronization signal, or a secondary synchronization signal, or both the primary and secondary synchronization signals.

5. The method of claim 1, wherein the overload indicator comprises at least one bit indicative of loading of the cell.

6. The method of claim 1, wherein the overload indicator indicates whether the cell observes heavy loading.

7. The method of claim 1, wherein the overload indicator is transmitted on a downlink carrier and indicates loading of at least one uplink carrier associated with the downlink carrier.

8. An apparatus for wireless communication, comprising:
   means for determining an overload indicator for a cell;
   means for transmitting a reference signal for the cell; and
   means for transmitting at least one synchronization signal comprising the overload indicator for the cell, wherein the overload indicator is transmitted on the at least one synchronization signal and the reference signal is used as a phase reference.

9. The apparatus of claim 8, wherein the at least one synchronization signal is transmitted with precoding and the reference signal is transmitted without precoding, the apparatus further comprising:
   means for transmitting information indicative of the precoding used for the at least one synchronization signal.

10. The apparatus of claim 8, further comprising:
    means for generating a plurality of symbols for a synchronization signal among the at least one synchronization signal;
    means for generating a symbol for the overload indicator;
    means for multiplying the plurality of symbols for the synchronization signal with the symbol for the overload indicator to obtain a plurality of modulated symbols; and
    means for generating the synchronization signal based on the plurality of modulated symbols.

11. An apparatus for wireless communication, comprising:
    a memory unit; and
    at least one processor coupled to the memory unit, the at least one processor configured:
    to determine an overload indicator for a cell,
    to transmit a reference signal for the cell, and
    to transmit at least one synchronization signal comprising the overload indicator for the cell, wherein the overload indicator is transmitted on the at least one synchronization signal and the reference signal is used as a phase reference.

12. The apparatus of claim 11, wherein the at least one processor is configured to transmit the at least one synchronization signal with precoding, to transmit the reference signal without precoding, and to transmit information indicative of the precoding used for the at least one synchronization signal.

13. The apparatus of claim 11, wherein the at least one processor is configured to generate a plurality of symbols for a synchronization signal among the at least one synchronization signal, to generate a symbol for the overload indicator, to multiply the plurality of symbols for the synchronization signal with the symbol for the overload indicator to obtain a plurality of modulated symbols, and to generate the synchronization signal based on the plurality of modulated symbols.

14. A computer program product, comprising:
    a non-transitory computer-readable medium having non-transitory program code recorded thereon, the program code comprising:
    code for causing at least one computer to determine an overload indicator for a cell,
    code for causing the at least one computer to transmit a reference signal for the cell, and
    code for causing the at least one computer to transmit at least one synchronization signal comprising the overload indicator for the cell, wherein the overload indicator is transmitted on the at least one synchronization signal and the reference signal is used as a phase reference.

15. A method for wireless communication, comprising:
determining an overload indicator for a cell;
sending a first transmission of at least one synchronization signal for the cell in a first time period; and
sending a second transmission of the at least one synchronization signal comprising the overload indicator in a second time period, wherein the overload indicator is conveyed by a phase difference between the second transmission of the at least one synchronization signal and the first transmission of the at least one synchronization signal.

16. The method of claim 15, further comprising:
generating a plurality of symbols for a synchronization signal among the at least one synchronization signal;
generating a symbol for the overload indicator;
multiplying the plurality of symbols for the synchronization signal with the symbol for the overload indicator to obtain a plurality of modulated symbols;
generating the first transmission of the synchronization signal based on the plurality of symbols; and
generating the second transmission of the synchronization signal based on the plurality of modulated symbols.

17. The method of claim 15, further comprising:
precoding the first and second transmissions of the at least one synchronization signal with same set of weights.

18. The method of claim 15, wherein the first time period corresponds to subframe 0 of a radio frame and the second time period corresponds to subframe 5 of the radio frame.

19. An apparatus for wireless communication, comprising:
means for determining an overload indicator for a cell;
means for sending a first transmission of at least one synchronization signal for the cell in a first time period; and
means for sending a second transmission of the at least one synchronization signal comprising the overload indicator in a second time period, wherein the overload indicator is conveyed by a phase difference between the second transmission of the at least one synchronization signal and the first transmission of the at least one synchronization signal.

20. The apparatus of claim 19, further comprising:
means for generating a plurality of symbols for a synchronization signal among the at least one synchronization signal;
means for generating a symbol for the overload indicator;
means for multiplying the plurality of symbols for the synchronization signal with the symbol for the overload indicator to obtain a plurality of modulated symbols;
means for generating the first transmission of the synchronization signal based on the plurality of symbols; and
means for generating the second transmission of the synchronization signal based on the plurality of modulated symbols.

21. The apparatus of claim 19, further comprising:
means for precoding the first and second transmissions of the at least one synchronization signal with same set of weights.

* * * * *